United States Patent
McCorkle, Jr. et al.

(10) Patent No.: US 10,536,475 B1
(45) Date of Patent: Jan. 14, 2020

(54) THREAT ASSESSMENT BASED ON COORDINATED MONITORING OF LOCAL COMMUNICATION CLIENTS

(71) Applicant: PhishCloud, Inc., Renton, WA (US)

(72) Inventors: Terry Stephen McCorkle, Jr., Renton, WA (US); Kyle Moody Hurst, Seattle, WA (US); William Lawrence Floyd, Seattle, WA (US)

(73) Assignee: PhishCloud, Inc., Renton, WA (US)

( * ) Notice: Subject to any disclaimer, the term of this patent is extended or adjusted under 35 U.S.C. 154(b) by 0 days.

(21) Appl. No.: 16/447,845

(22) Filed: Jun. 20, 2019

(51) Int. Cl.
 *H04L 29/06* (2006.01)
 *H04W 12/12* (2009.01)
(52) U.S. Cl.
 CPC ......... *H04L 63/1425* (2013.01); *H04W 12/12* (2013.01)
(58) Field of Classification Search
 CPC .................................................. H04L 63/1425
 USPC ......................................................... 726/22
 See application file for complete search history.

(56) References Cited

U.S. PATENT DOCUMENTS

| | | | |
|---|---|---|---|
| 2016/0065608 A1* | 3/2016 | Futty | H04L 63/1433 726/25 |
| 2016/0212165 A1* | 7/2016 | Singla | G06F 21/577 |
| 2017/0134430 A1* | 5/2017 | Feng | H04L 63/1408 |
| 2018/0189697 A1* | 7/2018 | Thomson | H04L 63/1408 |

* cited by examiner

Primary Examiner — Peter C Shaw
(74) Attorney, Agent, or Firm — John W. Branch; Lowe Graham Jones PLLC

(57) ABSTRACT

Embodiments are directed to managing communication over a network. A co-located assessment agent may monitor communication traffic and determine assets and interactions with communication clients associated with one or more remote services. Asset groups associated with the assets may be determined based on characteristics of the assets. Representative assets from each asset group may be determined. Risk scores associated with each asset in a same asset group as the representative assets may be determined based on the remote services associated with the representative assets and the interactions with the communication clients such that a first risk score is initially generated based on a catalog local to a communication client and a succeeding risk score may be generated remotely based on an assessment model. The assets may be modified based on the first risk score or the succeeding risk score and provided to communication clients for display to a user.

27 Claims, 16 Drawing Sheets

| Group ID | Asset URI | Asset Risk Score | Threat Class | [...] |
|---|---|---|---|---|
| 99 | http://b...b.org | nil | nil | nil |
| 100 | http://cc...c.edu | 80 | Danger | [...] |
| 101 | http://...oft.com/... | 10 | Safe | [...] |
| 101 | http://...oft.com/... | 10 | Safe | [...] |
| 101 | http://...oft.com/... | 10 | Safe | [...] |
| 102 | https://..ail.com | 50 | Unsafe | [...] |
| 103 | https://..ank.com/... | 78 | Danger | [...] |
| 104 | https://bi...ly/xB6ftb0 | nil | <shortened> | [...] |
| 104 | https://bi...ly/xfmO6Z1 | nil | <shortened> | [...] |
| 104 | https://bi...ly/xjlj2qq | nil | <shortened> | [...] |
| ... | ... | ... | ... | ... |

| Group ID | Asset URI | Asset Risk Score | Threat Class | [...] |
|---|---|---|---|---|
| 99 | http://b..b.org | nil | nil | nil |
| 100 | http://cc..c.edu | 80 | Danger | [...] |
| 101 | http://...oft.com/... | 10 | Safe | [...] |
| 101 | http://...oft.com/... | 10 | Safe | [...] |
| 101 | http://...oft.com/... | 10 | Safe | [...] |
| 102 | https://..ail.com | 50 | Unsafe | [...] |
| 103 | https://..ank.com/... | 78 | Danger | [...] |
| 104 | https://bi...ly/xB6ftb0 | nil | <shortened> | [...] |
| 104 | https://bi...ly/xfmO6Z1 | nil | <shortened> | [...] |
| 104 | https://bi...ly/xjlj2qq | nil | <shortened> | [...] |
| ... | ... | ... | ... | ... |

*Fig. 6A*

| Risk Score | Threat Class |
|---|---|
| > 70 | Danger |
| 25-69 | Unsafe |
| < 25 | Safe |
| ... | ... |

*Fig. 6B*

THREAT ASSESSMENT BASED ON COORDINATED MONITORING OF LOCAL COMMUNICATION CLIENTS

TECHNICAL FIELD

The present invention relates generally to securing electronic communication, and more particularly, but not exclusively to, managing risks associated with electronic communications.

BACKGROUND

Organizations increasingly rely on electronic communications to conduct internal or external business activities. Accordingly, employees at organizations or consumers/customers of organizations have been encouraged to use communication systems, such as, email, chat programs, or the like, to engage in commercial activity. Also, employees or customers have developed a similar reliance on communication systems, such as, email, chat, or the like. Further, employees may conduct personal business at work using employer owned devices on employer owned computers. In many cases, the communication systems (e.g., email, chat programs, or the like) used by employees are services provided by external service providers, including many cloud-based services. In some cases, this may make it difficult for organizations to enforce various security standards because another organization may be managing the backend of the services. Because of these and other factors, organizations may be forced to choose between blocking access to those services completely or live with the additional risk that external communication system may introduce. In some cases, organizations may implement training or testing programs to help ensure that their employees refrain from accessing dangerous/risky resources. However, providing tools to help employees or other users identify risky resources outside of training or testing may be difficult because in some cases the communication systems used by the employees or other users may be generally inaccessible to the organization that is seeking to protect itself. Thus, it is with respect to these considerations and others that the present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 6A illustrates a logical schematic of a portion of an asset catalog for threat assessment based on coordinated monitoring of local communication clients in accordance with one or more of the various embodiments;

FIG. 6B illustrates a logical schematic of a portion of a data structure for mapping risk scores to threat levels in accordance with one or more of the various embodiments;

DETAILED DESCRIPTION OF VARIOUS EMBODIMENTS

Figure 1:
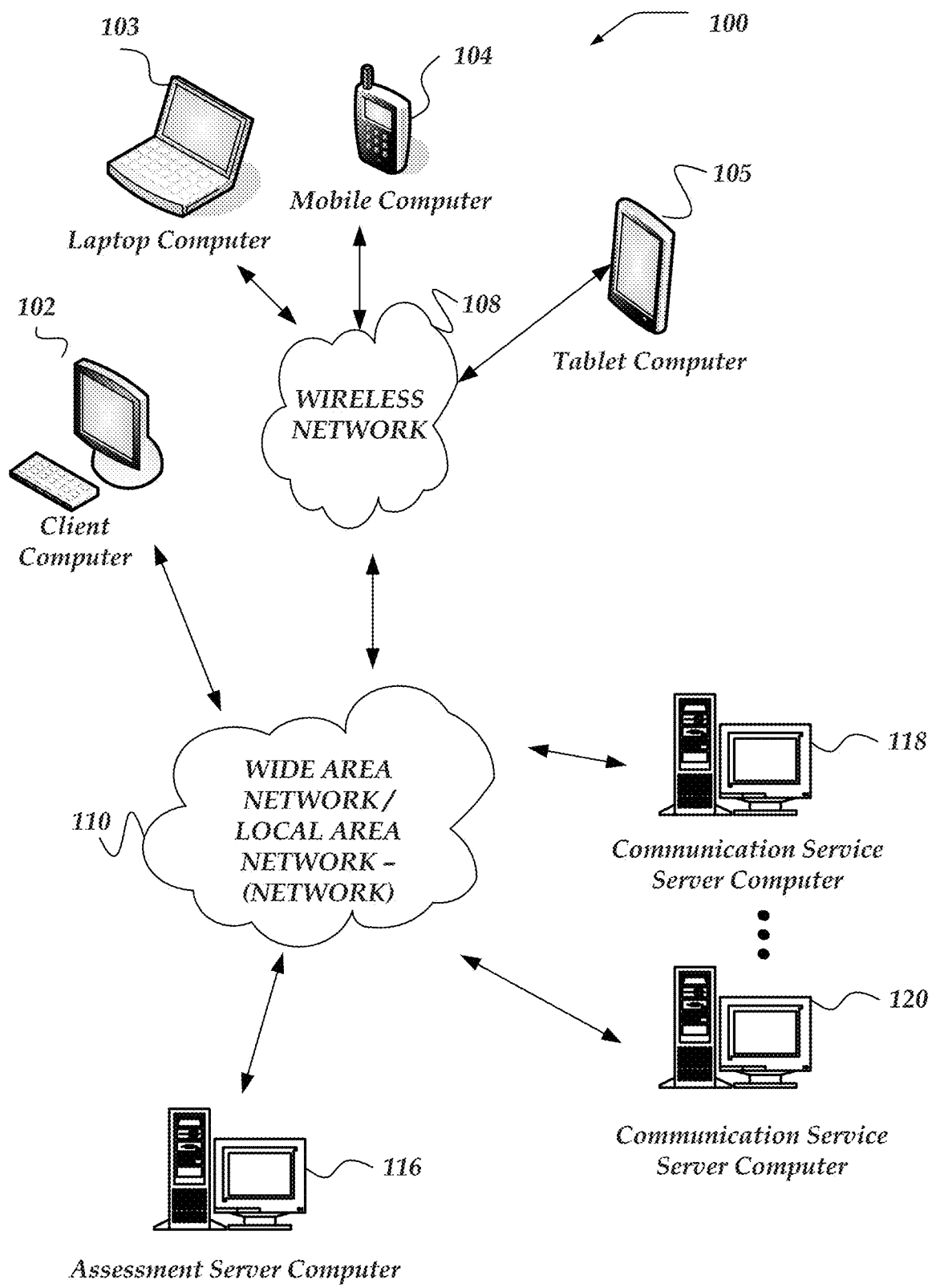
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, Go, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications. Further, in some cases, the one or more logical modules may be divided into sub-engines. The engines can be stored in non-transitory computer-readable medium or computer storage device and be stored on and executed by one or more general purpose computers, thus creating a special purpose computer configured to provide the engine.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

As used herein, the term "asset" refers to identified components or parts of a communication that may be assessed by an assessment engine. In some cases, assets may be included or embedded in user readable portions the communication. For example, common assets may include HTTP/HTML links (e.g., anchors), email addresses, telephone numbers, media (e.g., images, audio clips, video clips, or the like), embedded objects, scripts, or the like. In some cases, assets may be comprised of one or more visible elements or one or more non-visible elements, labels, or the like. For example, HTML link assets may include text or images that are intended to be visible to a user as well as markup elements that are used by a web browser to render or otherwise format the asset.

As used herein, the terms "user assessment," "user risk score," or "user assessment score" refer to a representation of risk that may be associated with a user. User assessment scores may be based on the assessment of multiple factors of user activity related to the overall risk associated with a given user. Organizations may employ user assessments to perform various actions including, identifying users that may need more training, enabling or disabling access to resources, or the like. Also, users may be enabled to see their own assessment score which may enable them to engage in self-guided activities to improve their user assessment score.

As used herein, the term "just-in-time training" refers to automated training sessions designed to train users to help them avoid malicious content. Training may be instigated based on, but not limited to, user assessments, specific asset risk scores, organization policy, or the like.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing communication over a network. In one or more of the various embodiments, a co-located assessment agent may be employed to monitor communication traffic and determine a plurality of assets and one or more interactions with one or more of a plurality of communication clients such that each asset may be associated with one or more remote services and the one or more communication clients. In one or more of the various embodiments, the plurality of assets may include one or more of Hyper Text Markup Language (HTML) anchor tags, or user-interface controls.

In one or more of the various embodiments, one or more asset groups associated with one or more of the plurality of assets may be determined based on one or more characteristics of the plurality of assets.

In one or more of the various embodiments, one or more representative assets from each asset group may be determined.

In one or more of the various embodiments, one or more risk scores associated with each asset in a same asset group as the one or more representative assets may be determined based on the one or more remote services associated with the one or more representative assets and the one or more interactions with the one or more communication clients, such that a first value for each of the one or more risk scores is initially generated based on a catalog local to a communication client, and such that a succeeding value of the first value may be generated remotely based on an assessment model.

In one or more of the various embodiments, determining the one or more risk scores, may include: providing one or more catalog entries based on the one or more representative assets such that the one or more catalog entries may be obtained from an asset catalog; determining the one or more risk scores based on the one or more catalog entries; or the like.

In one or more of the various embodiments, determining the one or more risk scores may further include: generating one or more initial risk scores based on an initial analysis of the one or more assets such that the one or more initial risk scores may be immediately provided to the assessment agent; generating one or more other risk scores based on an advanced analysis and the one or more assets; and providing the one or more other risk scores to the assessment agent such that the one or more modified assets are modified again based on the one or more other risk scores.

In one or more of the various embodiments, the one or more assets may be modified based on one or more of the first value or the succeeding value of each associated risk score such that the one or more modified assets may be provided to one or more communication clients for display to a user. In one or more of the various embodiments, modifying each of the plurality of assets, may include: providing style information that may correspond to the one or more risk scores such that the one or more communication clients may display the one or more plurality of assets based on the style information; disabling one or more interactive features of one or more of the plurality of assets based on the one or more risk scores; and stripping a Uniform Resource Locator (URL) from the one or more of the plurality of assets based on the one or more risk scores.

In one or more of the various embodiments, one or more user interactions with the plurality of modified assets may be monitored such that a report may be provided to the user based on the one or more user interactions. In one or more of the various embodiments, monitoring the one or more user interactions, may include: providing a user risk score that may be based on an assessment of the user interactions; and performing one or more actions based on the user risk score such that the one or more actions include initiating just-in-time training, or the like.

In one or more of the various embodiments, the one or more modified assets may be automatically updated based on one or more updated risk scores, wherein the one or more updated modified assets are provided to the one or more communication clients for display to the user.

In one or more of the various embodiments, one or more encoded assets from the plurality of assets may be determined based on one or more characteristics of the one or more encoded assets; one or more decoders may be determined based on the one or more encoded assets; and the one or more decoders may be employed to decode the one or more encoded assets, wherein the one or more decoded assets are associated with the one or more asset groups.

In one or more of the various embodiments, one or more of the communication traffic, the plurality of assets, or the one or more risk scores may be stored in a data store; the one or more assessment models may be generated based on the data store; and the one or more assessment models may be employed to provide one or more other risk scores based on one or more other assets.

Illustrated Operating Environment

FIG. 1 shows components of one embodiment of an environment in which embodiments of the invention may be practiced. Not all components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, assessment server computer 116, one or more communication service server computers, such as, communication service server computer 118 or communication service server computer data source server computer 120, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, assessment server computer 116, communication service server computer 118, communication service server computer 120, or other computers.

Client computers 102-105 may further be configured to include a client application that enables an end-user to log into an end-user account that may be managed by another computer, such as assessment server computer 116, communication service server computer 118, communication service server computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by assessment server computer 116, communication service server computer 118, communication service server computer 120.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence wireless network 108 may include virtually any wireless communication mechanism by which information may travel between client computers 103-105 and another computer, network, a cloud-based network, a cloud instance, or the like.

Network 110 is configured to couple network computers with other computers, including, assessment server computer 116, communication service server computer 118, communication service server computer 120, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of assessment server computer 116, communication service server computer 118, communication service server computer 120 are described in more detail below in conjunction with FIG. 3. Although FIG. 1 illustrates assessment server computer 116, communication service server computer 118, communication service server computer 120, or the like, each as a single computer, the innovations or embodiments are not so limited. For example, one or more functions of assessment server computer 116, communication service server computer 118, communication service server computer 120, or the like, may be distributed across one or more distinct network computers. Moreover, in one or more embodiments, assessment server computer 116, communication service server computer 118, communication service server computer 120 may be implemented using a plurality of network computers. Further, in one or more of the various embodiments, assessment server computer 116, communication service server computer 118, communication service server computer 120, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
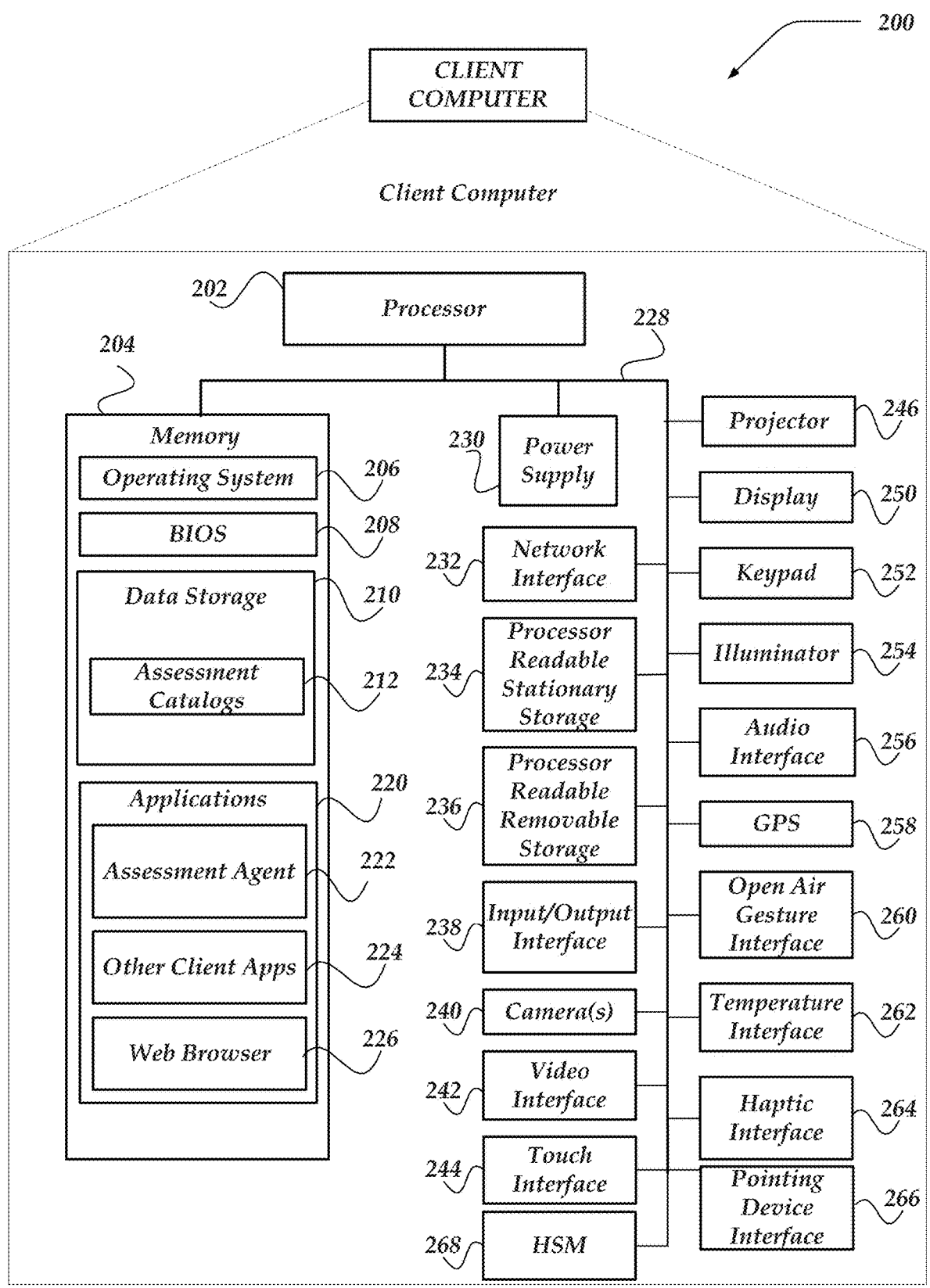
FIG. 2 illustrates a schematic embodiment of a client computer.

FIG. 2 shows one embodiment of client computer 200 that may include many configurations of components other than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back light the buttons on keypad 252 and stay on while the client computer is powered. Also, illuminator 254 may back light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220, assessment catalog 212, or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, assessment agent 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
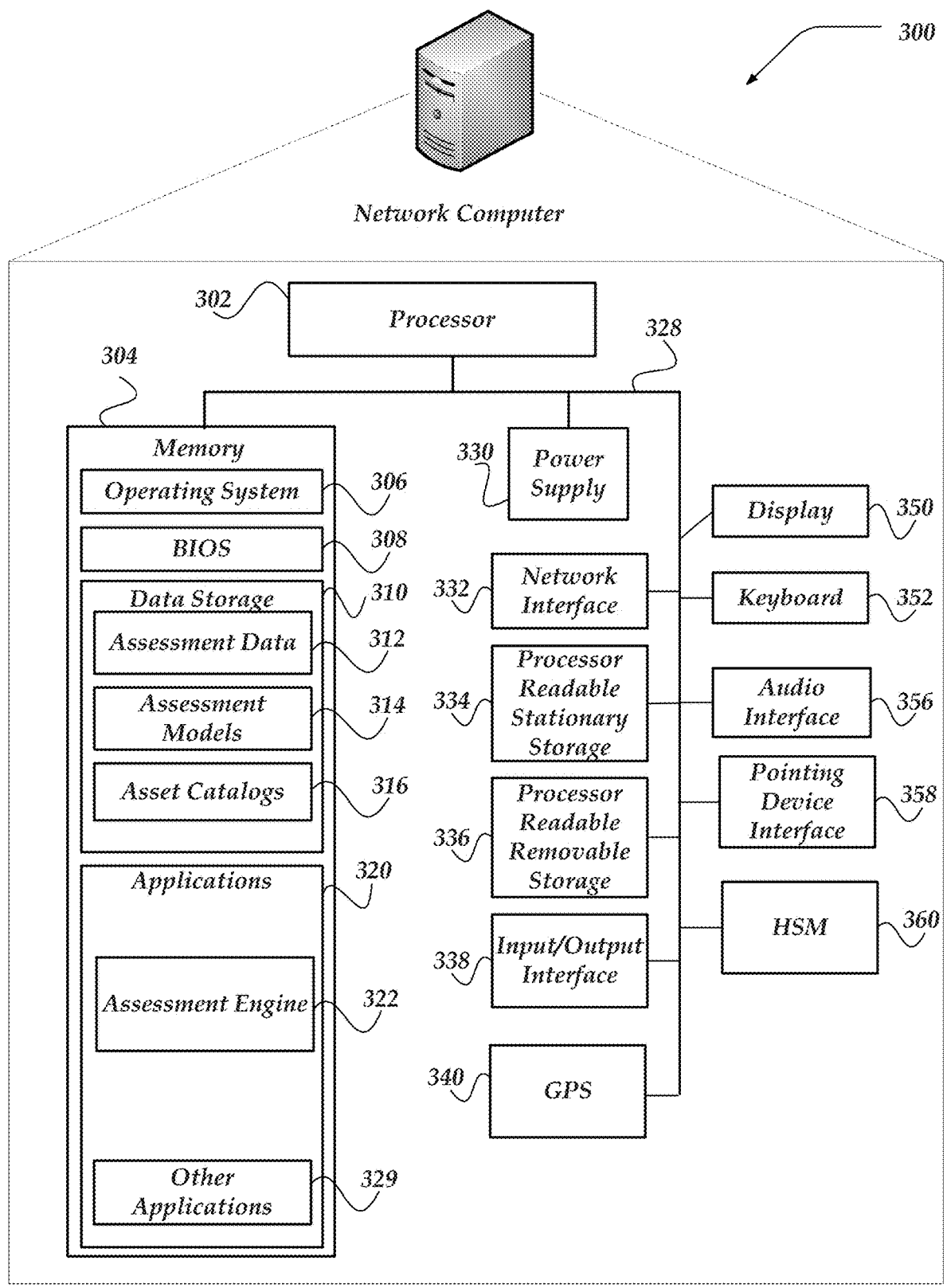
FIG. 3 illustrates a schematic embodiment of a network computer.

FIG. 3 shows one embodiment of network computer 300 that may be included in a system implementing one or more of the various embodiments. Network computer 300 may include many variations of components other than those shown in FIG. 3. However, the components shown are sufficient to disclose an illustrative embodiment for practicing these innovations. Network computer 300 may represent, for example, one embodiment of at least one of user interface provider server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, assessment engine 322, other applications 329, or the like, may be arranged to employ geo-location information to select one or more localization features, such as, time zones, languages, currencies, currency formatting, calendar formatting, or the like. Localization features may be used in user interfaces, communication traffic processing, asset parsing, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, assessment data 312, assessment models 314, assessment catalogs 316, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include assessment engine 322, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, assessment engine 322, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to assessment engine 322, other applications 329, or the like, may be provisioned and de-commissioned automatically.

Also, in one or more of the various embodiments, assessment engine 322, other applications 329, or the like, may be in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4A:
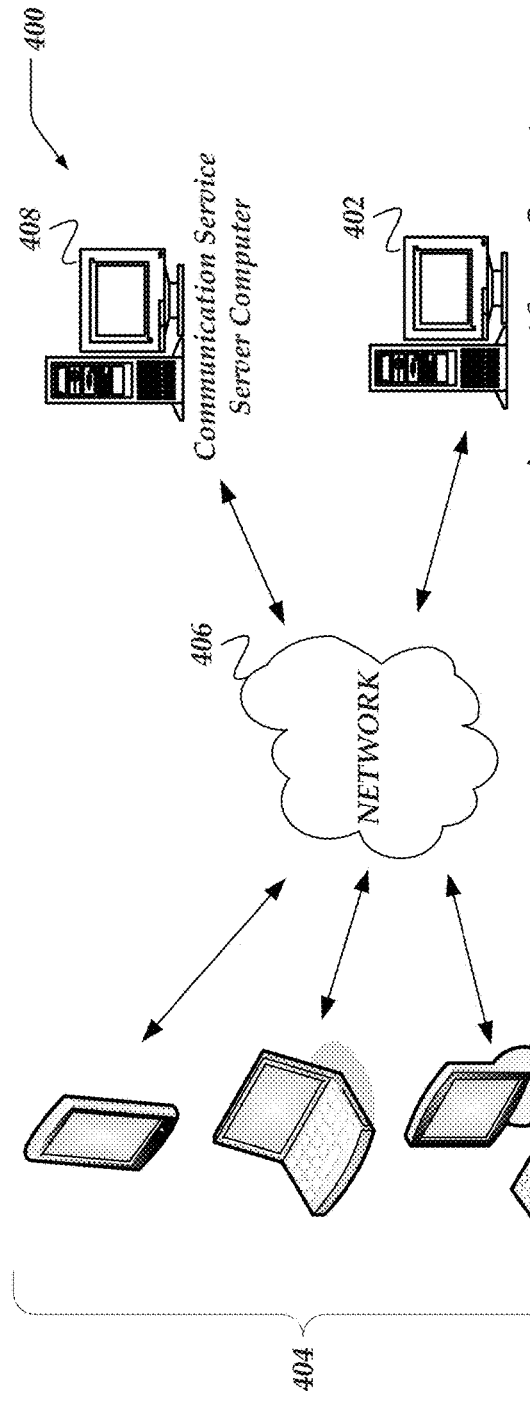
FIG. 4A illustrates a logical architecture of a system for threat assessment based on coordinated monitoring of local communication clients in accordance with one or more of the various embodiments.

FIG. 4A illustrates a logical architecture of system 400 for threat assessment based on coordinated monitoring of local communication clients in accordance with one or more of the various embodiments. In one or more of the various embodiments, system 400 may be arranged to include one or more assessment server computers, such as, assessment server computer 402, one or more client computers, such as, client computers 404, network 406, one or more communication service server computers, such as, communication service server computer 408, or the like. In one or more of the various embodiments, client computers 404 may be considered similar to client computers 102-105, client computer 200, or the like. Likewise, in some embodiments, assessment server computer 402 or communication service server computer 408 may be considered similar to assessment server computer 116, communication service server computer 118, network computer 300, or the like. And, in some embodiments, network 406 may be considered similar to one or both of network 108 or network 110.

In one or more of the various embodiments, client computers 404 may be employed by one or more users to view, send, or receive electronic communication from various communication services. In some embodiments, such communication services may include one or more or of email, chat, messages, or the like. In one or more of the various embodiments, email may be provided my one or more email providers, including: local providers (e.g., employer managed); commercial, private, or private remote email providers; or the like. Likewise, in some embodiments, chat or messaging services may be provided by local providers, remote providers, public providers, private providers, or the like.

In some embodiments, one or more communication services of the same general type may be employed or otherwise running on client computers 404 at the or different times. For example, a user may be running an email client for a local email provider for work related communication and running another email client for a remote email provider that may be used for personal communications.

In some embodiments, one or more assessment agents running on each client computer may be arranged to evaluate or process communication traffic at the client computer to perform one or more actions for threat assessment based on coordinated monitoring of local communication clients.

In one or more of the various embodiments, assessment agents on client computers 404 may be arranged to employ network 406 to provide information associated with communication traffic to assessment engine 402. In one or more of the various embodiments, network 406 may be considered to be the same or similar to network 108 or network 110 described with FIG. 1.

Accordingly, in one or more of the various embodiments, assessment engine 402 may be arranged to perform one or more additional actions to further assess the communication traffic. In some embodiments, assessment engines may be arranged to provide assessment information, or the like, to client computers 404 over network 406. In some embodiments, the assessment information may include threat assessment information associated with one or more portions of the communication traffic.

Figure 4B:
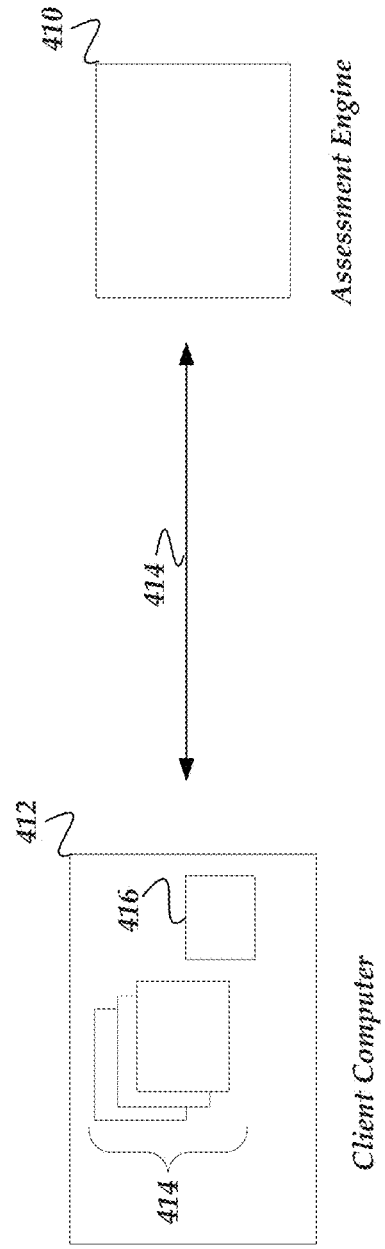
FIG. 4B illustrates a logical schematic of a client computer and an assessment engine for threat assessment based on coordinated monitoring of local communication clients in accordance with one or more of the various embodiments.

FIG. 4B illustrates a logical schematic of client computer 412 and assessment engine 410 for threat assessment based on coordinated monitoring of local communication clients in accordance with one or more of the various embodiments. In one or more of the various embodiments, client computer 412 may be representative of client computers 404 (in FIG. 4B).

In some embodiments, client computer 412 may be arranged to include one or more communication clients, such as, communication clients 414, assessment agent 416, or the like. In one or more of the various embodiments, assessment agent 416 may be arranged to communicate with assessment engine 410 over one or more network connections or network paths, such as, network connection 414, or the like.

Figure 5:
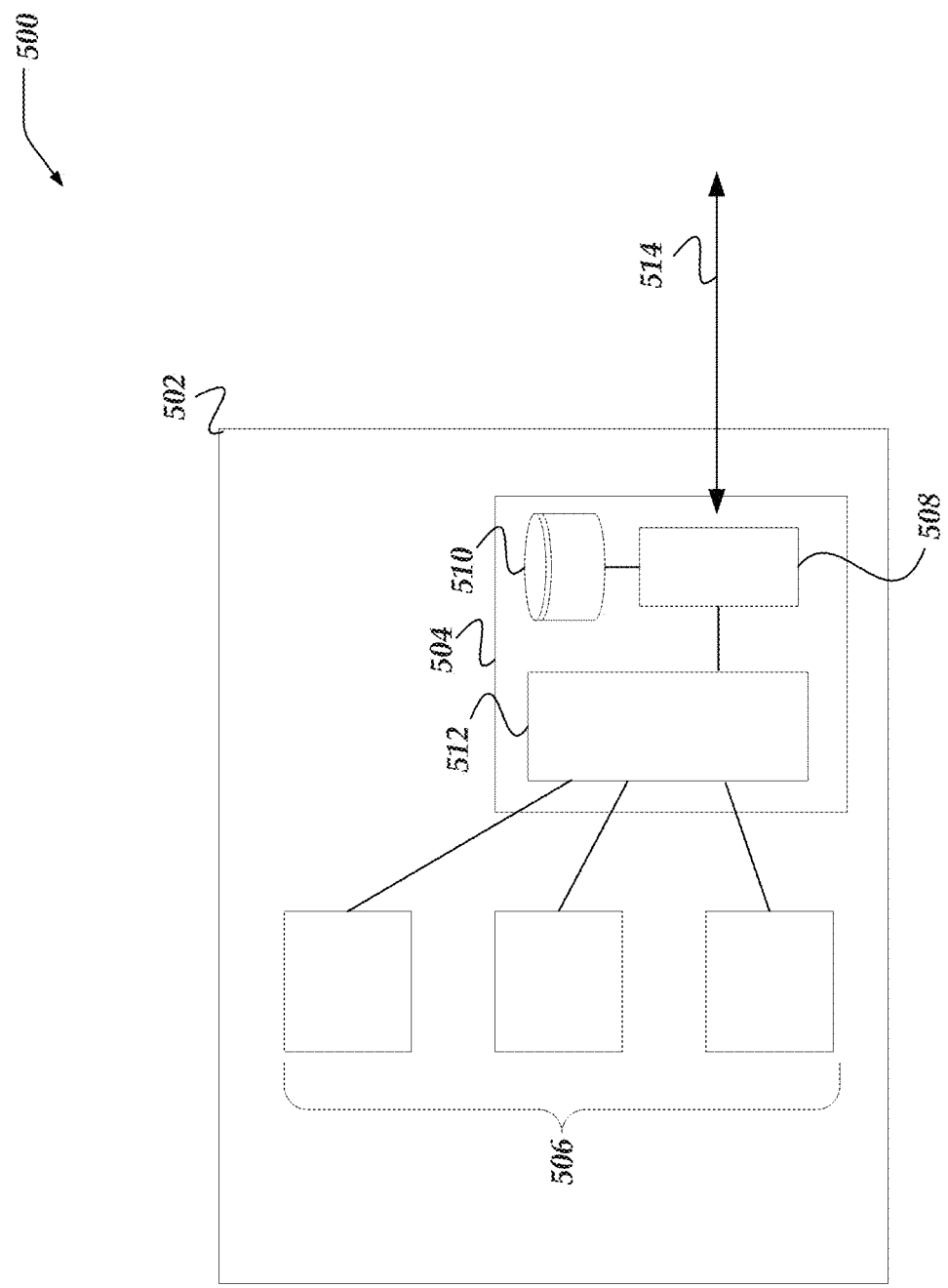
FIG. 5 illustrates a logical schematic of a portion of client computer for threat assessment based on coordinated monitoring of local communication clients in accordance with one or more of the various embodiments.

FIG. 5 illustrates a logical schematic of a portion of client computer 500 for threat assessment based on coordinated monitoring of local communication clients in accordance with one or more of the various embodiments. In one or more of the various embodiments, client computers, such as, client computer 500 may be considered similar to client computer 200, or the like. Accordingly, in one or more of the various embodiments, client computers, such as, client computer 500 may be arranged to include operating system 502, assessment agent 504, one or more communication clients, such as, communication clients 506, or the like.

In one or more of the various embodiments, assessment agents, such as, assessment agent 504 may be comprised of various components, including, local assessment engine 508, local asset catalog 510, capture engine 512, or the like.

In one or more of the various embodiments, local assessment engine 508 may be arranged to perform one or more actions to process assets, communicate with other (possibly remote) assessment engines, or the like. In some embodiments, local asset catalog 510 may be a local data store that may be arranged to store asset assessment information that may be associated with various assets. In some embodiments, capture engines, such as, capture engine 512 may be arranged to capture communication traffic that may be associated with communication clients 506, or the like.

In one or more of the various embodiments, communication client 506 may include various communication client applications, such as, email clients, text chat clients, video chat clients, voice chat clients, or the like. In some embodiments, one or more communication clients may be stand-alone or otherwise first-class applications running on client computer 502. Likewise, in some embodiments, one or more communication clients may include web-based or web-browser hosted applications.

Accordingly, in one or more of the various embodiments, capture engines, such as, capture engine 512 may be arranged to support one or more mechanisms that enable the capture engine to observe communication traffic associated with a given communication client, such as: integration with one or more APIs supported directly by a given communication client. In some embodiments; interfacing with the network services of the host operation system; enabling communication clients to register hooks with a capture engine; employing one or more host supported mechanisms; employing one or more custom interfaces that may be provided by a communication client specifically to integrate with capture engines; or the like; or combination thereof. For example, in some embodiments, assessment agent 504 may be arranged to employ one or more web browser extension/plug-in APIs to intercept or observe communication traffic that may be associated with an email or chat client. Thus, for example, in some embodiments, capture engine 512 may be arranged to receive communication traffic, such as, HTTP traffic or HTML content before it is provided to web-based communication clients.

Similarly, in some embodiments, for example, assessment agents hosted in Linux-based operating system may be arranged to use kernel level facilities, such as the open source netfilter framework, or the like, to capture communication traffic associated with communication clients. Likewise, in some embodiments, assessment agents hosted on computers running Microsoft Windows operating system may be arranged to employ one or more frameworks, such as, Windows Filtering Platform (WFP), or the like, to capture communication traffic associated with stand-alone communication clients. Further, in one or more of the various embodiments, assessment agents or assessment engines may be arranged to employ one or more custom services created for capturing or intercepting the communication traffic.

Accordingly, in one or more of the various embodiments, capture engine 512 may be arranged to provide some or all communication traffic to local assessment engine 508 for further processing as described below. In some embodiments, local assessment engine 508 may be arranged to employ information stored in asset catalog 510 during while processing or evaluating the communication traffic to assess threats that may be associated with the communication traffic.

Also, in one or more of the various embodiments, local assessment engine 508 may be arranged to communicate over network connection 514 with one or more assessment engines hosted by one or more assessment server computers (not shown).

FIG. 6A illustrates a logical schematic of a portion of asset catalog 600 for threat assessment based on coordinated monitoring of local communication clients in accordance with one or more of the various embodiments. In one or more of the various embodiments, assessment agents or assessment engines may be arranged to maintain one or more asset catalogs that may be employed to track threat assessment information that may be associated with one or more assets that may be associated with communication traffic.

In one or more of the various embodiments, asset catalogs may be arranged to include various components, including one or more data structures, such as, data structure 602. In some embodiments, data structures, such as, data structure 602, may be arranged to include various properties, such as, group ID 604, asset URI 606, risk score 608, threat class 610, additional properties 612, or the like.

In this example, for some embodiments, group ID 604 may be employed to identify which asset group an asset may be associated with. In some embodiments, asset groups may include one asset, as shown by asset record 614. In this example, asset record 614 has a group ID of '99' representing an asset group that has one member. In contrast, in this example, asset records 618 represent three assets that are members of the same asset group. Accordingly, in this example, each asset record in asset records 614 has the same group ID of '101'.

In some embodiments, data structures, such as, data structure 602 may be arranged to include one or more properties for identifying or otherwise distinguishing assets from each other. In this example, asset URI 606 is used to identify the asset. In some embodiments, assets that can be completely represented using the URI (e.g., HTML links/anchors, network endpoints, or the like) may be stored in the Asset URI. In other cases, for some embodiments, asset URIs may be references or pointers to assets that assessment agents or assessment engines may employ to retrieve the actual asset content.

In one or more of the various embodiments, asset catalogs may be arranged to employ a risk score property, such as, risk score 608 for associating assessment information with an asset. In this example, asset record 616 has a risk score of 80. In some embodiments, risk scores may be generated during the assessment of assets. In some embodiments, risk scores may represent a relative risk level or threat level of assets. In this example, risk scores may be configured run from 1-100 with higher scores implying more risk relative to lower scores. In other embodiments, risk scores may employ different ranges or different interval between values. Accordingly, in one or more of the various embodiments, assessment engines or assessment agents may be arranged to employ rules or information provided via configuration information to determine risk score ranges, intervals, or the like.

In one or more of the various embodiments, asset catalogs may be arranged to employ a threat class property, such as, threat class 610 for associating threat assessment information with an asset. In this example, asset record 616 has a threat class of Danger because it has been assessed as being dangerous. In this example, other assets may be associated other threat class values, including, Safe, Unsafe, Danger. In one or more of the various embodiments, organizations may be enables to map risk score to threat classes at their own discretion. Also, in some embodiments, organizations may be enabled to assign or customize the name, labeling, or the like, that may be associated with different threat classes. In some embodiments, organizations may be enabled to associate particular security actions to threat classes. Accordingly, in one or more of the various embodiments, organizations may customize threat classes and associated actions to meet their own requirements. For example, in some embodiments, organization A may be less sensitive to risk than organization B. Accordingly, in this example, organization A may associate risk scores above 75 with threat classes representing "danger" while organization B may associate risk scores above 50 with threat classes representing "danger."

In one or more of the various embodiments, asset catalogs may include information about assets that have not been assessed. For example, in some embodiments, assets included in communication traffic may be added to asset catalogs before they have been assessed by assessment agents or assessment engines. Accordingly, in this example, assets that may be associated with a threat class of nil may be considered assets that have not been assessed. In this example, asset record 614 is associated with a threat class of nil indicating that the associated asset has not been assessed.

In one or more of the various embodiments, one or more assets may require additional processing or specialized processing based on one or more characteristics of the assets. Accordingly, in one or more of the various embodiments, one or more properties in asset catalogs may be arranged to represent that assets may require additional or specialized processing. In this example, asset group 620 includes three assets that are currently associated with an asset risk score of 'nil' because they have not been assessed. In this example, the shortened tag (<shortened>) shown in threat class column 610 may represent that the asset is a HTML link that has been encoded by a URL shortening service. Accordingly, in this example, assessment agents or assessment engines may be arranged to interpret the <shortened> tag as indicating that it should perform additional steps to unshorten the asset before assessing its risk. In other circumstances, different tag values may indicate other decoding or processing requirements, such as, tags that indicate that an asset is encrypted and requires decryption before it may be assessed. Note, in some embodiments, asset catalog 602 may be arranged such that other columns or fields may be used for representing if assets need additional processing before assessment. Here, for brevity and clarity threat class column 610 has been overloaded to include processing tags, but one of ordinary skill in the art will appreciate the other methods or data structures may be employed to represent if assets need additional processing before assessment.

In one or more of the various embodiments, asset catalogs may be arranged to include various different or additional properties for storing meta-data, or the like, that may be associated with assets. In this example, property 612 may represent one or more additional properties that may store values such as, timestamps, locale information, expiry/aging information, or the like.

In one or more of the various embodiments, assessment engines or capture engines may be arranged to associate logged information, including packet capture information with a catalog entry.

In one or more of the various embodiments, other combinations of data objects may be used to provide similar features for representing or storing asset catalogs. For example, asset catalog 602 may be combined with another data object, separated into multiple data objects, replaced with one or more alternative data objects, or omitted (e.g., by employing inherent or implicit properties, associations, characteristics, or the like). Also, for clarity and brevity, asset catalog 602 is represented here using a tabular format. In some embodiments, data objects, such as, asset catalog 602 may be arranged differently, such as using different formats, data structures, objects, or the like.

FIG. 6B illustrates a logical schematic of a portion of data structure 622 for mapping risk scores to threat levels in accordance with one or more of the various embodiments. As described above, risk scores may be mapped to threat classes based on the security requirements of each organization. In some embodiments, assessment engines may be arranged to provide the mapping for data structure 622 via configuration information, or the like.

Figure 7:
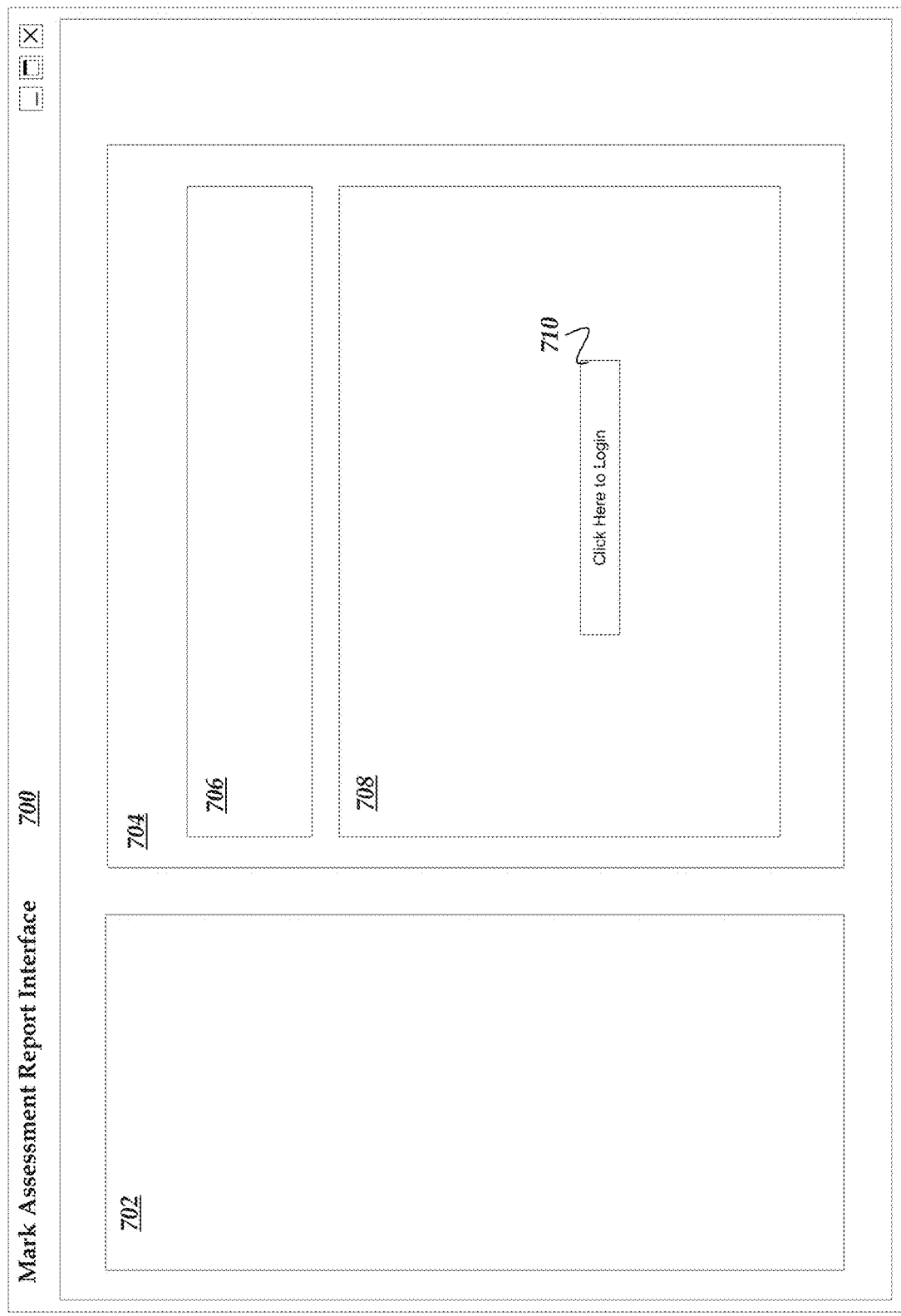
FIG. 7 illustrates a portion of a user interface for threat assessment based on coordinated monitoring of local communication clients in accordance with one or more of the various embodiments.

FIG. 7 illustrates a portion of user interface 700 for threat assessment based on coordinated monitoring of local communication clients in accordance with one or more of the various embodiments. In this example, user interface 700 may represent an email client, or the like. Accordingly, in this example, user interface 700 may include several panels, including: side panel 702 that may represent a user's email message inbox, or the like, that enables accessing one or more email messages; panel 704 may represent an email displayed in the email client; panel 706 may represent a user interface panel for displaying/interacting with sender/subject header information of an email message; and panel 708 may represent a panel for displaying/interacting with the main body or content of an email message.

Also, in this example, asset 710 represents an asset, such as a click-able link or image that may be included in the email body.

In one or more of the various embodiments, assessment agents may be arranged to intercept communication traffic before it is provided to the user. In some embodiments, this may enable assessment engines to parse through the communication traffic to identify assets that may be of interest. In some embodiments, a local assessment agent may perform the initial parsing of the communication traffic to determine one or more assets that may be included in one or more messages.

Accordingly, in one or more of the various embodiments, determined assets may be assessed locally or remotely to categorize the risk of the determined assets. In some embodiments, assessment engines may be arranged to assign each asset to a discrete category, such as, dangerous, unsafe, safe, or the like. Further, in some embodiments, assessment engines may be arranged to assign risk scores to the assets that may correspond to a risk or threat range or to discrete categories. Also, in some embodiments, assessment engines may be arranged to associate additional meta-data with categorized assets, such as, confidence scores, explanatory text narratives, tracking data (e.g., timestamps, user identifiers, client identifiers, source identifiers, portions of the associated network traffic, or the like), markup or style indicators, or the like.

In one or more of the various embodiments, each threat category (e.g., dangerous, unsafe, safe, or the like) may be associated with distinctive styling, such as, coloring, border markings, or the like. Accordingly, in some embodiments, assessment agents or assessment engines may be arranged to modify the communication traffic to incorporate styling that corresponds with the threat level associated with the assets.

In one or more of the various embodiments, assessment engines or assessment agents may be arranged to modify or disable one or more interactive features that may be associated with assets. In some embodiments, an assessment agent may be arranged to modify dangerous or unknown assets such that users may be disabled from triggering potentially harmful actions that may be caused by interacting with the dangerous assets, unsafe, or unknown assets. For example, in some embodiments, an asset, such as, a HTML anchor (e.g., link) may be modified to disable the link from working. In this example, for some embodiments, this may be accomplished by replacing the provided HTML representation of the anchor asset with different HTML that prevents the link from working.

Figure 8:
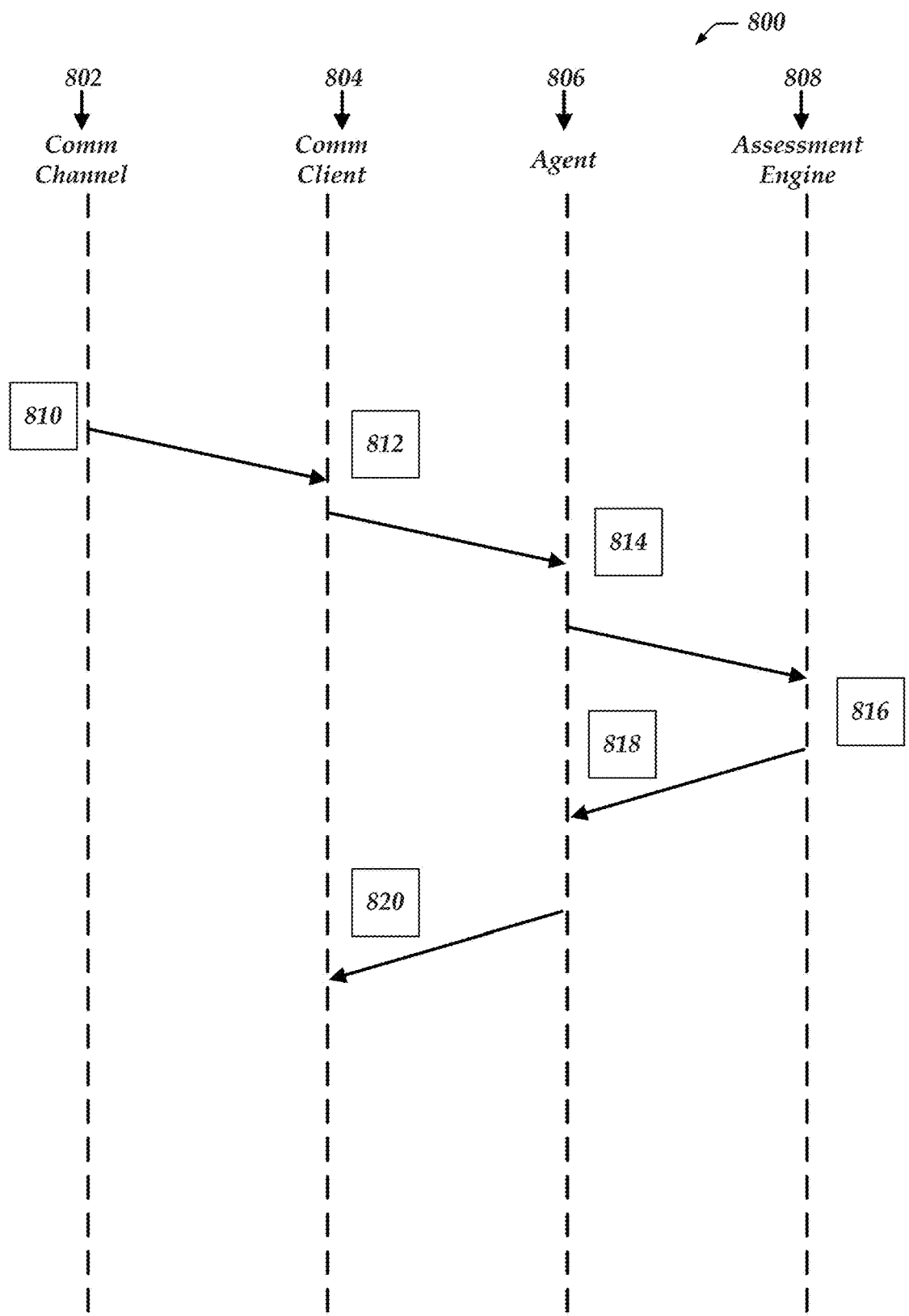
FIG. 8 illustrates a diagram of a sequence that represents steps for threat assessment based on coordinated monitoring of local communication clients in accordance with one or more of the various embodiments.

FIG. 8 illustrates a diagram of sequence 800 represent steps for threat assessment based on coordinated monitoring of local communication clients in accordance with one or more of the various embodiments.

At step 810, in one or more of the various embodiments, one or more communication services may provide communication traffic via communication channel 802 to communication client 804. As described above, in some embodiments, assessment agents running on the same computer as the communication client may be arranged to intercept the communication traffic before the communication client provides the communication information to the user. The mechanism for intercepting the communication traffic may depend on the type of communication client or client computer. For example, if communication client 804 is a web browser, assessment agent 806 may be arranged to employ a browser plugin, or the like, to capture the communication traffic before it is rendered or otherwise provided to the user.

At step 812, in one or more of the various embodiments, the communication traffic may be provided to assessment agent 806. In some embodiments, assessment agents may be arranged to capture the communication traffic directly. In other embodiments, assessment agents may be arranged to run separately from the communication client. Accordingly, in some embodiments, a capture agent may be arranged to pass some, or all, of the intercepted communication traffic to the assessment agent via an operating system communication service, or the like.

At step 814, in one or more of the various embodiments, assessment agent 806 may be arranged to perform one or more actions to process some, or all, of the communication traffic. In some embodiments, for some communication traffic this may include providing information associated with one or more assets to assessment engine 808. As described above, assessment agents may be arranged to parse the communication traffic to identify assets and provide them to assessment engines.

In one or more of the various embodiments, assessment agents may be arranged to employ a local asset catalog to determine the threat level that may be associated with an asset. Thus, in some embodiments, if a local asset catalog includes a valid entry for an asset under consideration, the assessment agent may determine the threat level directly from the asset catalog rather than waiting for assessment engine 808.

At step 816, in one or more of the various embodiments, assessment engine 808 may be arranged to assess the assets and provide assessment information to assessment agent 806. In one or more of the various embodiments, assessment engines may be arranged to execute various actions described in more detail below to assess each asset to determine a risk score. Accordingly, in some embodiments, assessment engines may be arranged to generate assessment information that may be associated with each asset based on the risk scores. In one or more of the various embodiments, the assessment information may be communicated back to assessment agent 806.

Note, in some embodiments, if the assessment agent determines that the threat levels associated with assets from a local asset catalog, step 816 may be omitted or delayed.

At step 818, in one or more of the various embodiments, assessment agent 806 may be arranged to modify the communication traffic based on the assessment information before providing the modified communication traffic to communication client 804. In some embodiments, the modifications may include one or more user recognizable/visible annotations that clearly indicate the threat level that may be associated with the assets. For example, in some embodiments, if communication client 804 is a web browser, assessment agent 806 modify the HTML code associated with one or more assets to show the annotation information. Likewise, in this example, for some embodiments, assessment agents, such as, assessment agent 806 may be arranged to alter the HTML code in the communication traffic to modify or disable one or more of the interactive actions (if any) that may be associated one or more assets before provided the modified communication traffic to communication client 804.

At step 820, in one or more of the various embodiments, communication client 804 may be arranged to display the modified communication traffic to a user. In some embodiments, assessment agent 806 may continue to monitor user interactions that may be associated one or more assets that may be included in the communication traffic. Accordingly, in some embodiments, user interactions (or attempts) may be logged or otherwise monitored to determine if users are honoring the threat level that may be associated with one or more assets. For example, in some embodiments, assessment agents may be arranged to generate notification information or log records if each time a user tries to click a link asset that has been annotated as unsafe.

Figure 9:
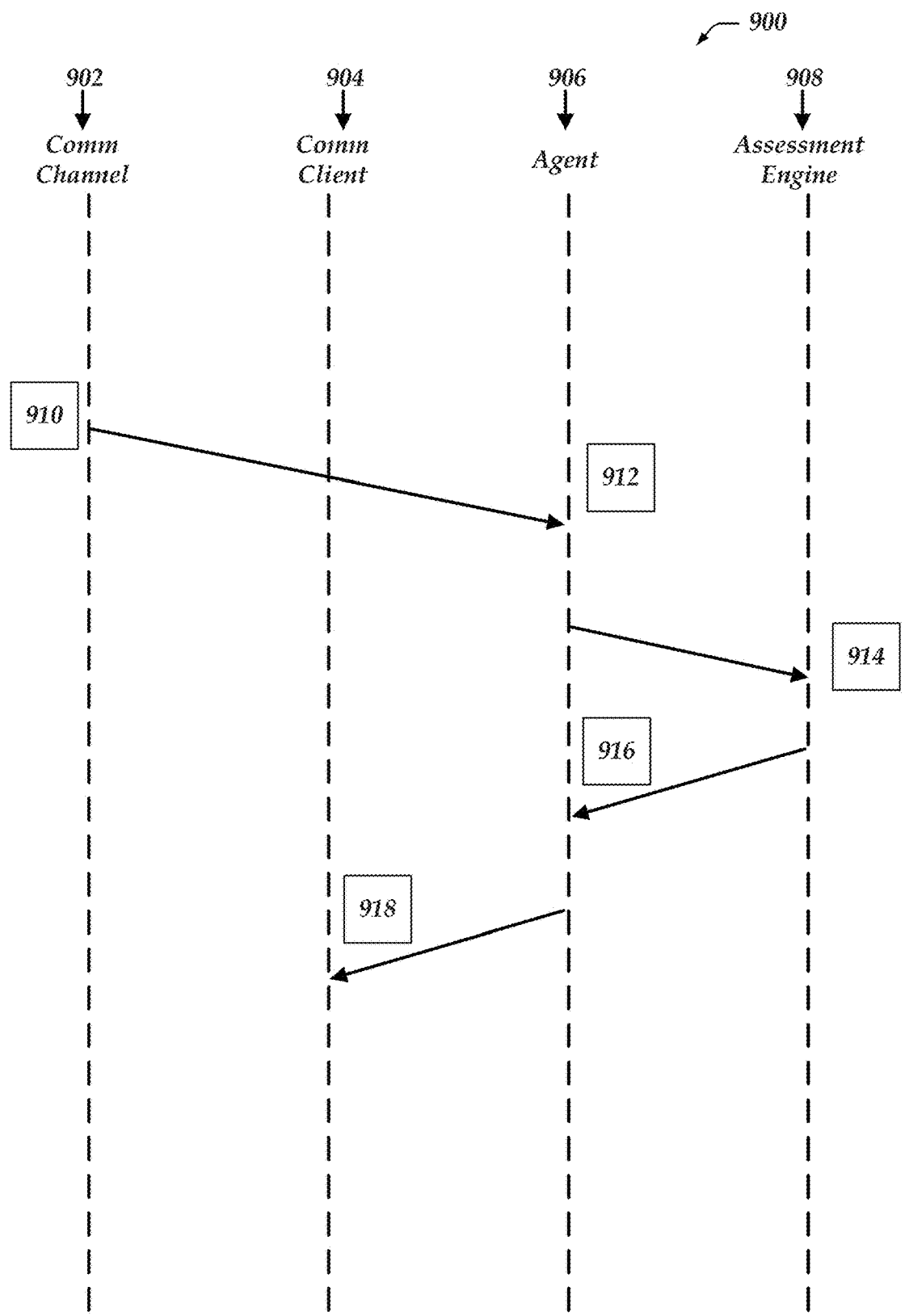
FIG. 9 illustrates a diagram of a sequence representing steps for threat assessment based on coordinated monitoring of local communication clients in accordance with one or more of the various embodiments.

FIG. 9 illustrates a diagram of sequence 900 representing steps for threat assessment based on coordinated monitoring of local communication clients in accordance with one or more of the various embodiments.

Note, in some embodiments, sequence 900 may be considered similar to sequence 800. However, in this example, sequence 900 represents embodiments that may be arranged to capture communication traffic before it reaches communication client 904. Though for brevity and clarity some details described for FIG. 8 have been omitted here.

At step 910, in one or more of the various embodiments, one or more communication services may provide communication traffic via communication channel 902 to assessment agent 906.

At step 912, in one or more of the various embodiments, assessment agent 906 may perform one or more actions to process some, or all, of the communication traffic. In some embodiments, for some communication traffic this may include providing information associated with one or more assets to assessment engine 908.

At step 914, in one or more of the various embodiments, assessment engine 908 may be arranged to assess the assets and provide assessment information to assessment agent 906.

At step 916, in one or more of the various embodiments, assessment agent 906 may be arranged to modify the communication traffic based on the assessment information provided from communication client 904.

At step 918, in one or more of the various embodiments, communication client 804 may be arranged to display the modified communication traffic to a user. In some embodiments, assessment agent 806 may continue to monitor user interactions that may be associated one or more assets that may be included in the communication traffic.

Generalized Operations

FIGS. 10-16 represent generalized operations for threat assessment based on coordinated monitoring of local communication clients in accordance with one or more of the various embodiments. In one or more of the various embodiments, processes 1000, 1100, 1200, 1300, 1400, 1500, and 1600 described in conjunction with FIGS. 10-16 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers (including containers), such as those in a cloud-based environment. However, embodiments are not so limited and various combinations of network computers, client computers, or the like may be utilized. Further, in one or more of the various embodiments, the processes described in conjunction with FIGS. 10-16 may be used for threat assessment based on coordinated monitoring of local communication clients in accordance with at least one of the various embodiments or architectures such as those described in conjunction with FIGS. 1-9. Further, in one or more of the various embodiments, some, or all, of the actions performed by processes 1000, 1100, 1200, 1300, 1400, 1500, and 1600 may be executed in part by one or more of assessment agent 222, assessment engine 322, or the like.

Figure 10:
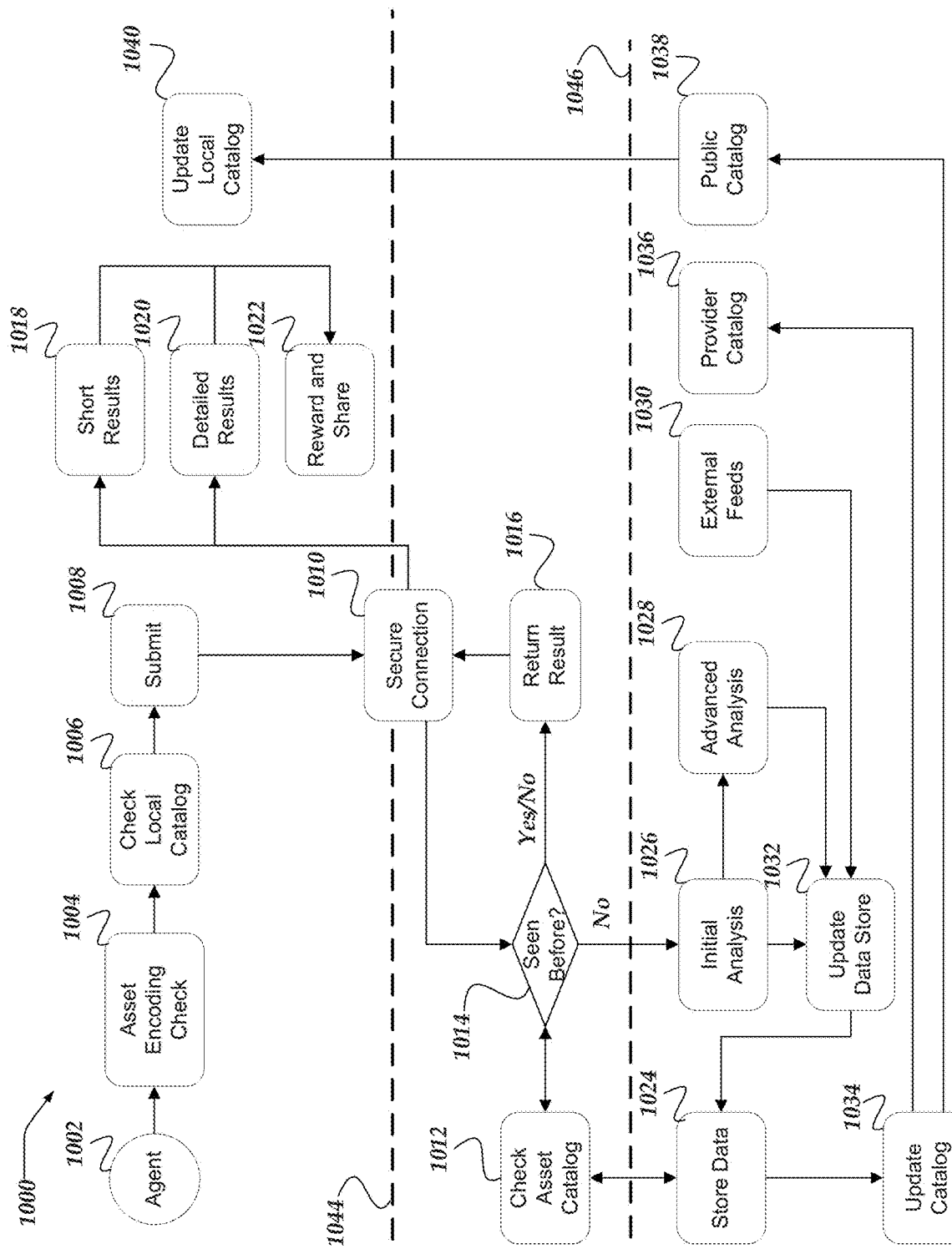
FIG. 10 illustrates an overview flowchart of a process for threat assessment based on coordinated monitoring of local communication clients in accordance with one or more of the various embodiments.

FIG. 10 illustrates an overview flowchart of process 1000 for threat assessment based on coordinated monitoring of local communication clients in accordance with one or more of the various embodiments.

At block 1002, in one or more of the various embodiments, one or more assessment agents may be arranged to monitor communication traffic that may be associated with one or more communication clients. As described above, assessment agents may be arranged to parse or filter incoming communication traffic to determine one or more assets that may be included in the communication traffic. For example, in some embodiments, assessment agents may be arranged to parse incoming HTML to identify HTML links (e.g., anchor tags) that may be included in web pages or email.

At block 1004, in one or more of the various embodiments, assessment agents may be arranged to determine if one or more assets may be encoded. Accordingly, in some embodiments, encoded assets may be decoded before assessment. For example, in some embodiments, in some cases, URLs included in HTML links may use "shortened links" rather than the original source link. Thus, in this example, the assessment agent may determine if a URL has been shortened or otherwise modified or encoded. Note, herein for brevity and clarity, encoded assets may be considered to be assets that have been modified before they were included in the communication traffic.

At block 1006, in one or more of the various embodiments, assessment agents may be arranged to employ a local asset catalog to assess incoming assets. In one or more of the various embodiments, asset catalogs include assessment information about assets. In some embodiments, asset catalogs may be arranged to include information, such as, risk scores that indicate the threat level of one or more assets. Accordingly, in some embodiments, assessment agents may be arranged to determine an asset threat level based on a valid entry in an asset catalog. In some cases, for some embodiments, a catalog entry for an asset may be absent, invalid, or otherwise non-authoritative. In some embodiments, reasons for invalid entries may include expiration of a timeout which may indicate staleness of the information.

At block 1008, in one or more of the various embodiments, assessment agents may be arranged to submit the assets for assessment. In some embodiments, assessment agents may be arranged to perform some, or all, of the assessment locally. In other embodiments, assessment agents may be arranged to employ remote services or computers to perform some or all of the assessment actions.

At block 1010, in one or more of the various embodiments, assessment agents may be arranged to establish or employ a secure connection to one or more local or remote assessment engines to assess the asset. Accordingly, in one or more of the various embodiments, if the assessment is occurring locally, the secure connection may employ various operating system supported inter-process communication facilities, such as, domain sockets, shared memory, pipes, RPC, COM/DCOM, various operating system services, or the like. In contrast, in some embodiments, if the assets are being assessed remotely, the secure connection may employ one or more network communication protocols.

At block 1012, in one or more of the various embodiments, an assessment engine running on an assessment server computer may be arranged to determine if the asset being assessed has a valid entry in its asset catalog. In some embodiments, this may include executing one or more pattern matching actions based on configuration information.

At decision block 1014, in one or more of the various embodiments, assets that have a valid entry in an asset catalog may have been previously assessed. In some embodiments, assessment engines may be arranged to assess the asset directly from information obtained from an asset catalog. If the asset is known to the assessment engine and the relevant assessment information is valid, it may return a result immediately. Accordingly, in some embodiments, if the asset is known to the assessment engine, control may flow to block 1016; otherwise, control may flow to block 1026.

At block 1016, in one or more of the various embodiments, assessment engines may be arranged to generate assessment information for the asset and provide it to the assessment agent that may be associated with the asset that is under consideration.

At block 1018, in one or more of the various embodiments, shortened/brief assessment results may be provided. At block 1022, in some embodiments, detailed assessment results may be provided.

In one or more of the various embodiments, the assessment information may be employed by assessment agents to provide annotations or markup that may be associated the asset as it is displayed to the user in their communication clients. In some embodiments, assessment agents may be arranged to modify the ability of a user to interact with the asset based on the assessment information. For example, in some embodiments, if an HTML link asset is determined to be associated with a malicious or suspicious source, the assessment agent may modify the asset such that a user cannot use the link to navigate. For example, in some embodiments, if the asset is classified as a threat, the assessment agent may be arranged to remove the URL from the anchor tag before the communication traffic is provided to communication client for presentation to user.

At block 1024, in one or more of the various embodiments, information associated with the asset may be stored or retrieved from a data store. In some embodiments, this information may include asset catalog information, as well, as other supporting information, such as, history information, log information, network traffic (e.g., partial or complete packet captures), or the like.

At block 1026, in one or more of the various embodiments, because the asset may be unknown to system 1000, assessment engines may be arranged to perform an initial analysis of the asset. In some embodiments, the initial analysis may include one or more operations that may provide a full or partial assessment of the asset. For example, in one or more of the various embodiments, if the asset includes a URL, the initial analysis may be limited to fast operations such as looking up the URL in a table or catalog.

At block 1028, in one or more of the various embodiments, because the asset may be unknown to system 1000, assessment engines may be arranged to perform an advanced analysis of the asset. In one or more of the various embodiments, advanced analysis may be operations that provide an improved assessment of the asset at a greater cost, in time or otherwise.

At block 1030, in one or more of the various embodiments, assessment engines may be arranged to monitor one or more external feeds that may provide information that may be employed to assess an asset. For example, in some embodiments, one or more third-party services may provide white-list/black-list information associated with various assets. Accordingly, in some embodiments, information from such services may be incorporated and adaptable to assess assets.

At block 1032, in one or more of the various embodiments, some, or all, of the information associated with the initial analysis (block 1026), advanced analysis (block 1028) may be provided for updating the data store.

At block 1034, in one or more of the various embodiments, assessment engines may be arranged to generate information that may be used to update asset catalogs. Accordingly, in one or more of the various embodiments, as the data store is updated with information from various sources, updated asset catalog information may be automatically generated.

At block 1036, in one or more of the various embodiments, assessment engines may be arranged to update asset catalog information for one or more communication providers. Accordingly, in one or more of the various embodiments, a communication provider may be enabled to maintain asset catalogs for use within its network. In some embodiments, this may include asset catalogs for organizations or enterprises. Thus, in some embodiments, asset catalogs may include information that may be customized for an organization or a particular communication provider.

At block 1038, in one or more of the various embodiments, one or more asset catalogs may be considered public asset catalogs that may be publicly available.

At block 1040, in one or more of the various embodiments, assessment agents may be arranged to update local asset catalogs based on asset information provided by the assessment engines. In this example, block 1040 represents how assessment agents may update asset catalogs based on one or more public asset catalogs.

Note, in this example, blocks illustrated as being above dashed line 1044 may be considered to be executed by assessment agents running on client computers. Blocks illustrated as being in between dashed line 1044 and dashed line 1046 may be considered to be running on an assessment server or a gateway server. And, blocks illustrated as being below dashed line 1048 may be considered to executing on assessment server or other backend server.

Figure 11:
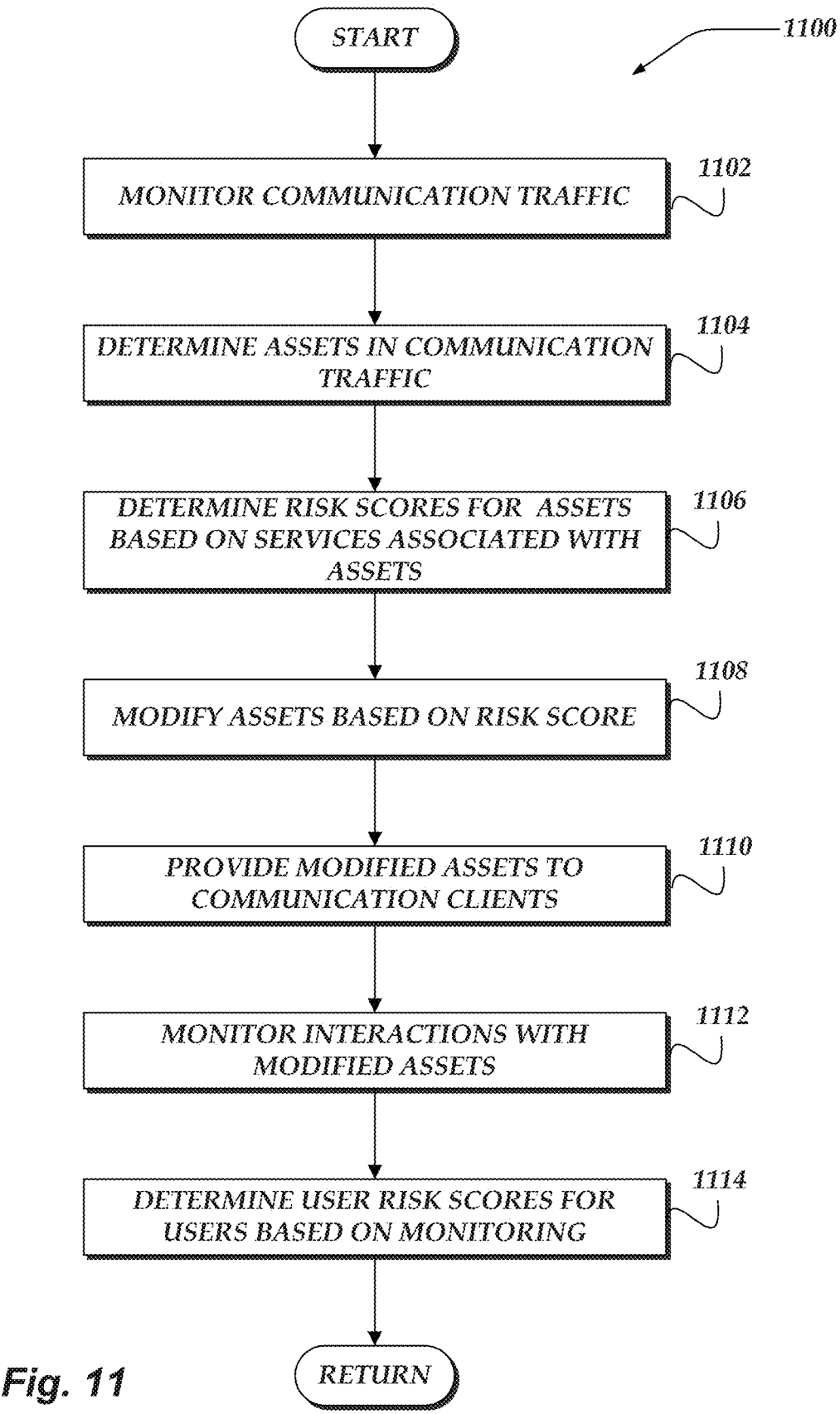
FIG. 11 illustrates a logical overview of a system for threat assessment based on coordinated monitoring of local communication clients in accordance with one or more of the various embodiments.

FIG. 11 illustrates a logical overview of system 1100 for threat assessment based on coordinated monitoring of local communication clients in accordance with one or more of the various embodiments. After a start block, at block 1102, in one or more of the various embodiments, one or more assessment agents may be arranged to monitor communication traffic that may be associated with one or more communication clients.

At block 1104, in one or more of the various embodiments, assessment agents running on client computers may be arranged to determine one or more assets that may be included in the communication traffic. In one or more of the various embodiments, this may be accomplished by parsing the communication traffic to determine the assets. In some embodiments, assessment engines may be arranged to employ pattern matching, machine learning trained classifiers, heuristics, or the like, to identify assets included in the communication traffic.

In one or more of the various embodiments, assessment engines may be arranged to determine which asset to look for and how to identify various assets based on configuration information. For example, in some embodiments, an assessment engine may be arranged to employ a set of regular expressions loaded from configuration information to determine some, or all, of the assets that may be included in communication traffic.

At block 1106, in one or more of the various embodiments, the assessment agents or one or more assessment engines may be arranged to determine risk scores for the one or more assets based on services that may be associated with the one or more assets. In some embodiments, one or more assets may be well-known to be reliably associated with known organizations. For example, link assets may be confirmed to be associated with a given organization based on their URLs.

In one or more of the various embodiments, assessment engines may be arranged to employ heuristics, machine learning models, rules, formulas, or the like, determine or predict the organization (if any) that may be associated with a given asset. Accordingly, in some embodiments, various organizations may be associated with risk scores or risk weights that may be employed to compute a risk score for each asset.

In some embodiments, assessment engines may be arranged to automatically modify scores, or weights associated with organizations based on real-time information. For example, assessment engines may be arranged to receive threat information from various sources. Thus, in this example, assessment engines may be arranged to employ the received threat information to modify risk scores or risk weights.

In one or more of the various embodiments, the facilities for assessing assets may be considered assessment models that may incorporate various different mechanisms to determine risk scores for assets. For example, assessment model A may include pattern matching, heuristics, and machine learning classifiers while assessment model B includes script driven rules for assessing one or more assets. In one or more of the various embodiments, different assessment models may be associated with different types of assets, different users, different organizations, different asset providers/sources, or the like.

At block 1108, in one or more of the various embodiments, the one or more assessment agents may be arranged to modify the one or more assets based on the risk scores associated with the one or more assets. In one or more of the various embodiments, assessment agents may be arranged to modify the configuration information to mark or annotate the assets based on their risk score. In some embodiments, the modifications may be arranged to inform users about the risk level that may be associated with assets included in the communication traffic to users. Also, in some embodiments, the modifications may include disabling some, or all, of the interactive capabilities/features associated with one or more assets.

At block 1110, in one or more of the various embodiments, the one or more assessment agents may be arranged to provide the modified assets to the communication clients. In one or more of the various embodiments, assessment agents have visibility to which communication client is being used. Accordingly, in some embodiments, assessment agents may know the communication protocol, markup language, display languages, formatting, or the like, that is used by the relevant communication clients. Accordingly, in some embodiments, assessment agents may be arranged to modify the assets to reveal their threat level or risk score in ways that are compatible with the communication clients.

At block 1112, in one or more of the various embodiments, the one or more assessment agents may be arranged to monitor one or more interactions that may involve the modified assets. In one or more of the various embodiments, assessment agents may be arranged to monitor if the user attempts to interact with assets that are annotated as unknown or unsafe. Further, in some embodiments, the annotations or modification to the assets may be arranged to enable users to submit feedback, such as, a grade or score the indicates agreement or disagreement with the threat assessment of a given asset.

In one or more of the various embodiments, the information collected via motioning of user feedback may be employed to identify assessment models that may require re-training or tuning.

At block 1114, in one or more of the various embodiments, assessment engines may be arranged to determine one or more user risk scores based on monitoring how users interact with assets. In one or more of the various embodiments, user risk scores may enable organizations to identify which users may benefit from additional training, or the like. Likewise, user risk scores may enable organizations to identify users that may be candidates for limiting access rights, additional monitoring, counseling, or discipline. Next, control may be returned to a calling process.

Figure 12:
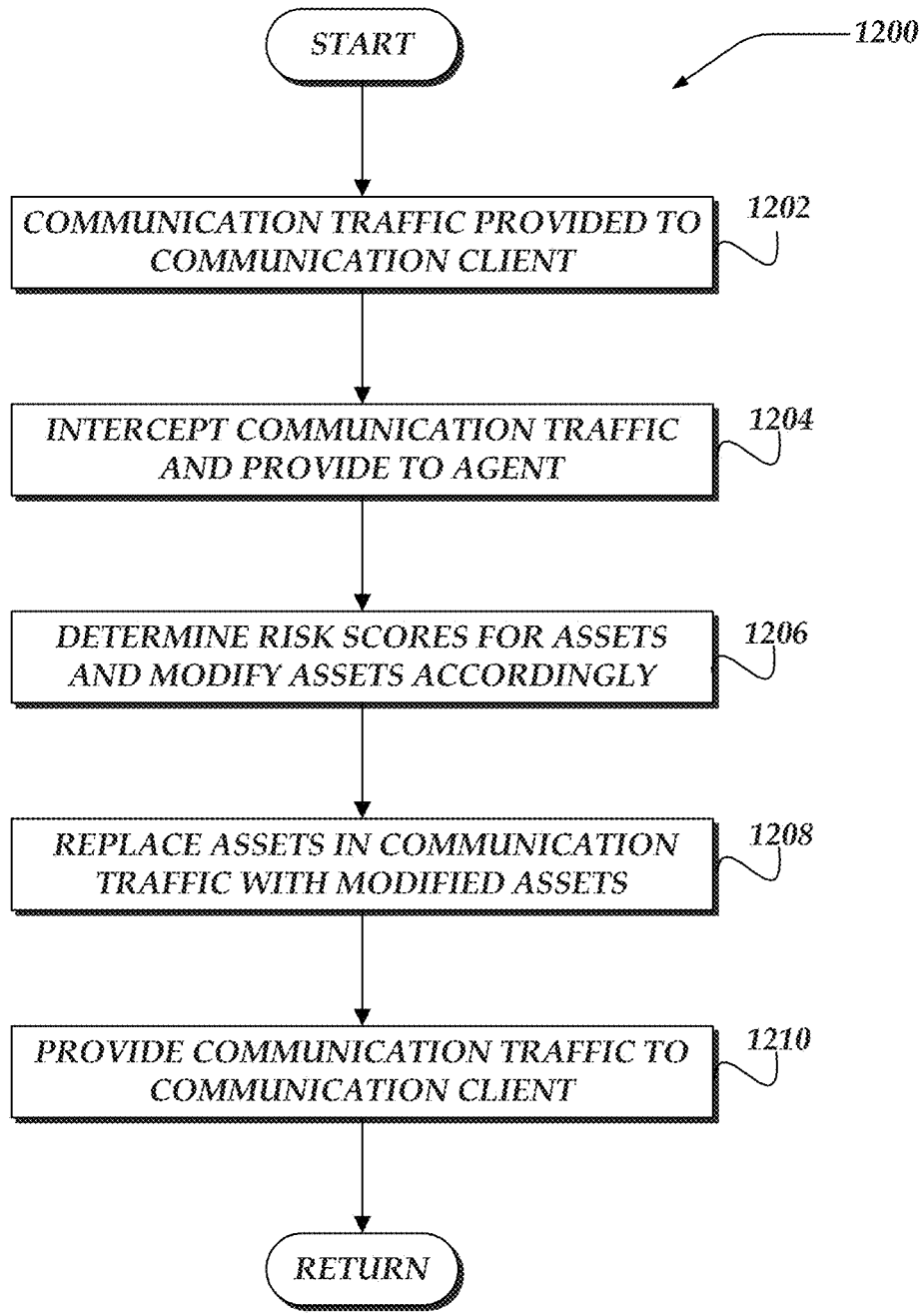
FIG. 12 illustrates a flowchart of a process for employing assessment agents in threat assessment based on coordinated monitoring of local communication clients in accordance with one or more of the various embodiments.

FIG. 12 illustrates a flowchart of process 1200 for employing assessment agents in threat assessment based on coordinated monitoring of local communication clients in accordance with one or more of the various embodiments. After a start block, at block 1202, in one or more of the various embodiments, communication traffic may be directed towards a communication client.

At block 1204, in one or more of the various embodiments, the communication traffic may be intercepted and provided to the assessment agent.

At block 1206, in one or more of the various embodiments, the assessment agent or an assessment engine may be arranged to determine risk scores to associate with assets included in the communication traffic and modify the assets accordingly.

At block 1208, in one or more of the various embodiments, the assessment agent may be arranged to modify the one or more assets and replace the unmodified assets in the communication traffic with the modified assets.

At block 1210, in one or more of the various embodiments, the assessment agent may be arranged to provide the communication traffic that includes the modified assets to the communication client.

Next, in one or more of the various embodiments, control may be returned to a calling process.

Figure 13:
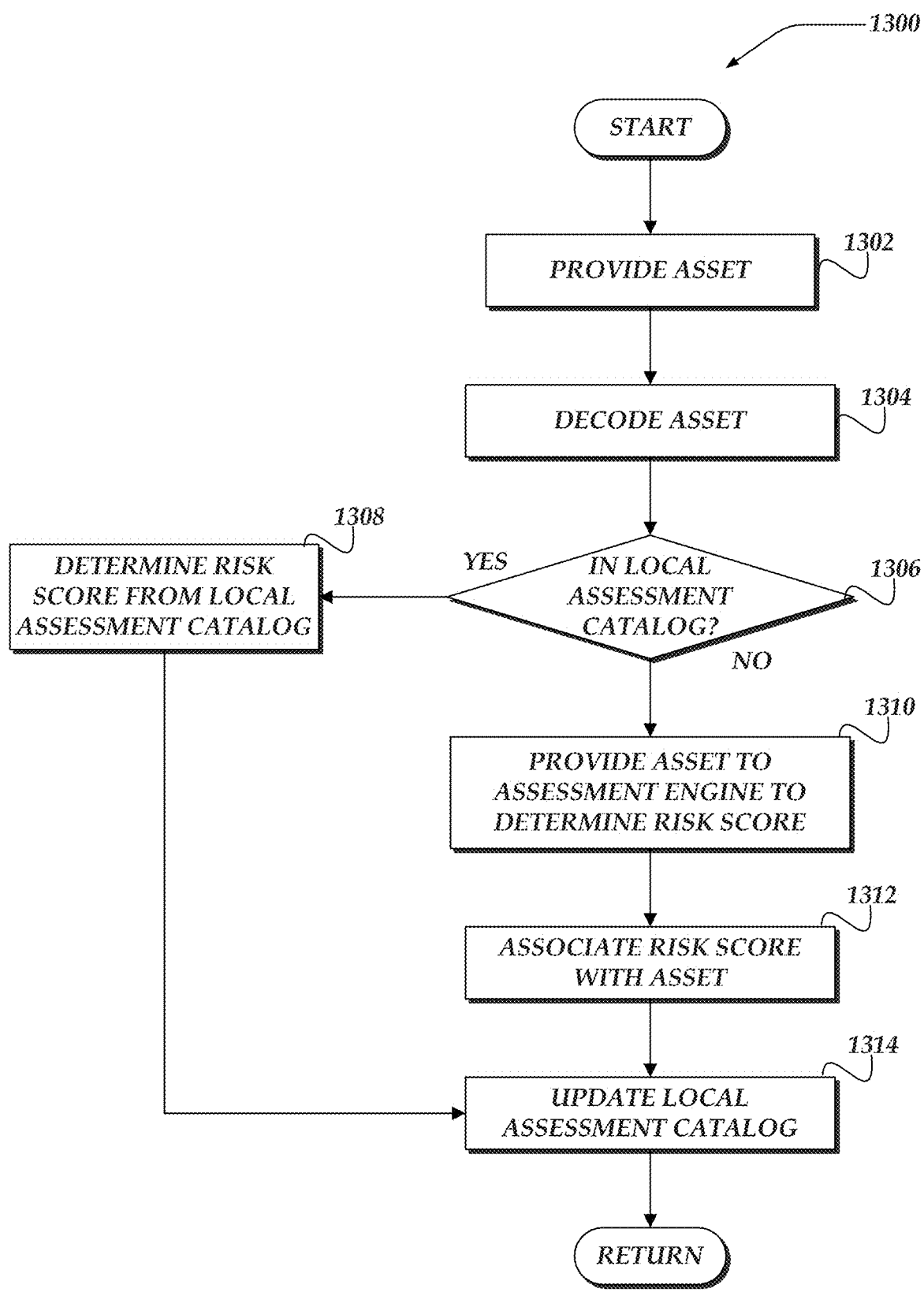
FIG. 13 illustrates a flowchart of a process for assessing assets in threat assessment based on coordinated monitoring of local communication clients in accordance with one or more of the various embodiments.

FIG. 13 illustrates a flowchart of process 1300 for assessing assets in threat assessment based on coordinated monitoring of local communication clients in accordance with one or more of the various embodiments. After a start block, at block 1302, in one or more of the various embodiments, assessment agents may be arranged to determine one or more assets that may be included in communication traffic.

At block 1304, in one or more of the various embodiments, assessment agents may be arranged to decode one or more of the assets. In one or more of the various embodiments, decoding assets may include expanding shortened URLs. In some embodiments, decoding assets may include converting assets from one or more formats to another format that may be more conducive for threat assessment.

At decision block 1306, in one or more of the various embodiments, if the asset has a valid entry in the local asset catalog, control may flow to block 1308; otherwise, control may flow to block 1310.

At block 1308, in one or more of the various embodiments, because a valid catalog entry for the asset has been found in the local asset catalog, the assessment agent may be arranged to determine a risk score for the asset based on information included in the asset catalog.

At block 1310, in one or more of the various embodiments, because a valid catalog entry for the asset was not found in the local asset catalog, the assessment agent may be arranged to provide the asset to an assessment engine to assess the asset.

In one or more of the various embodiments, even if the local asset catalog includes a valid entry for the asset, there may be problems associated with the asset that were not represented in the catalog entry. Accordingly, in some embodiments, the assessment engine may assess the asset based on information that may be unavailable to the assessment agent.

Further, in some embodiments, assessment engines may be arranged to log additional information that may be unsuitable for storing in a local asset catalog. For example, in some embodiments, if the assessment agent employs information in its asset catalog to determine that an asset is unsafe, it may be advantageous to store additional information for further analysis. In some cases, the additional information may include various metrics or data that may be associated with an asset, such as, source/destination network addresses, some, or all, of the network traffic associated with the asset, user interaction methods, or the like.

At block 1312, in one or more of the various embodiments, the assessment engines may be arranged to associate a risk score with the asset. In some embodiments, assessment engines may be arranged to employ configuration information to determine the specific rules for assigning a risk score to a given asset.

At block 1314, in one or more of the various embodiments, the assessment engines may be arranged to update one or more local asset catalogs. In some embodiments, asset catalogs associated with one or more communication clients may be updated based on the analysis of assets that may be associated with other communication clients.

Accordingly, in one or more of the various embodiments, more than one communication client may benefit from the analysis performed for one communication client. In some embodiments, if the analysis does not provide new information about an asset, the asset catalog entries for that asset may have a timestamp value updated.

Next, in one or more of the various embodiments, control may be returned to a calling process.

Figure 14:
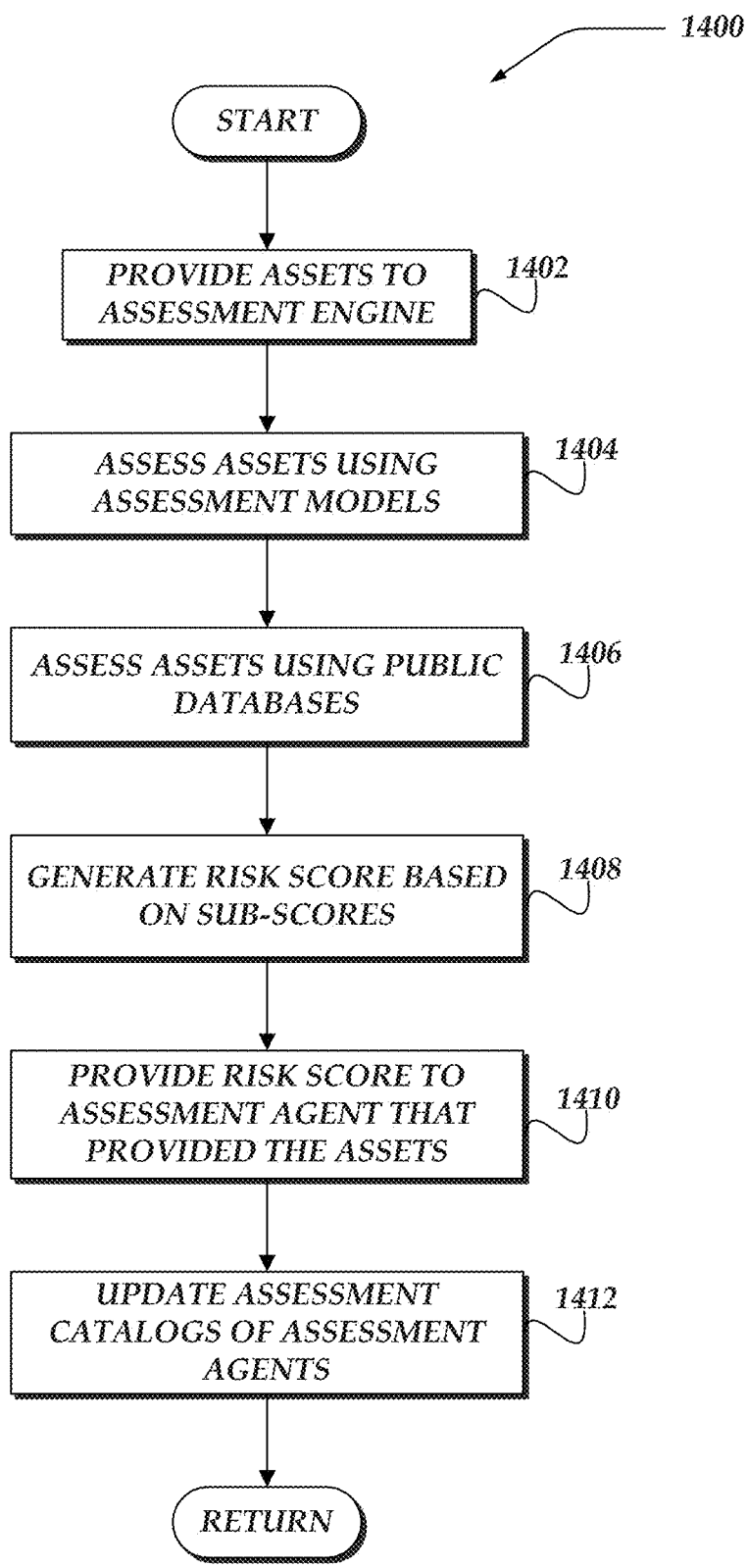
FIG. 14 illustrates a flowchart of a process for employing assessment engines to perform threat assessment of assets in accordance with one or more of the various embodiments.

FIG. 14 illustrates a flowchart of process 1400 for employing assessment engines to perform threat assessment of assets in accordance with one or more of the various embodiments. After a start block, at block 1402, in one or more of the various embodiments, one or more assets may be provided to an assessment engine. As described above, in some embodiments, assessment agents may monitor communication traffic to determine one or more assets that may be included in the communication traffic.

At block 1404, in one or more of the various embodiments, assessment engines may be arranged to employ one or more assessment models assess the provided assets. In one or more of the various embodiments, assessment models may be arranged to receive assets as well as various assessment inputs that may be associated with assets. In some embodiments, assessment models may employ the assessment inputs (including the assets) to generate risk scores. In some embodiments, assessment models may be combined with other facilities to generate risk scores. Accordingly, in some embodiments, if a risk score may be combined with other risk scores, they may be considered to be risk sub-scores.

In one or more of the various embodiments, assessment models may be comprised of one or more machine learning models, one or more heuristics, one or more formulas, one or more functions, one or more rules, or the like. Further, in some embodiments, there may be more than one assessment model that may be employed to provide risk scores or risk sub-scores. In some embodiments, the various assessment models may be associated with values (e.g., coefficients) that may be used to weight the importance or relevancy of the scores that may be produced.

In some embodiments, one or more assessment models may be selected based on one or more characteristics of the assets being assessed. In some embodiments, additional assessment information that may be associated with assets may be employed as well to select assessment models. For example, in one or more of the various embodiments, link assets that link to certain service providers may be assessed using different assessment models that link assets the link directly to documents or other objects. Likewise, in some embodiments, assessment models arranged to assess script assets, media assets, or the like, may be different than the assessment models used to assess link assets. In one or more of the various embodiments, assessment engines may be arranged to employ configuration information to determine the rules for selecting assessment models for particular assets.

At block 1406, in one or more of the various embodiments, assessment engines may be arranged to assess assets using information provided by one or more public or otherwise external databases. For example, one or more government agencies or non-governmental organizations may provide databases to include threat information about various assets. In some embodiments, this information may be checked to confirm or update risk scores for assets.

In one or more of the various embodiments, the information from external data source may be automatically collected and stored in a local data source. Accordingly, in some embodiments, the information may be subjected to one or more of filtering, normalization, transformations, mapping, or the like, after it is collected before storing into the data source. In some embodiments, given that each external data source may employ distinct APIs, credential requirements, data formats, or the like, assessment engines may be arranged to employ configuration information to determine how to connect to the external databases as well as how to process the data they may be provided.

In one or more of the various embodiments, if the assessment models in block 1406 have provided a risk score, the risk score based on the external data sources may be considered a risk sub-score.

At block 1408, in one or more of the various embodiments, assessment engines may be arranged to combine the one or more risk scores (e.g., sub-scores) into a single risk score. In some embodiments, each risk sub-score may be associated with value that may be used to weight the importance of a given risk sub-score. In some embodiments, assessment engines may be arranged to employ configuration information to determine the particular rules to use for combining one or more risk scores into a single score. For example, in one or more of the various embodiments, configuration information may define a rule that provides a risk score by taking the average value of the provided scores. In other embodiments, a rule may be arranged such that the 'unsafest' risk score supersedes any safer score.

At block 1410, in one or more of the various embodiments, assessment engines may provide the risk scores to the requesting assessment agents. In some embodiments, the risk scores may be provided with other assessment information that may also be provided to the assessment agents.

At block 1412, in one or more of the various embodiments, assessment engines may be arranged to update one or more asset catalogs that may be associated with other assessment agents. In some embodiments, asset information provided by one assessment agent may be shared with other assessment agents even though they have not encountered the same assets. Accordingly, in one or more of the various embodiments, assessment agents may be arranged to update their local asset catalogs based on the assessment effort performed for other assessment agents.

Next, in one or more of the various embodiments, control may be returned to a calling process.

Figure 15:
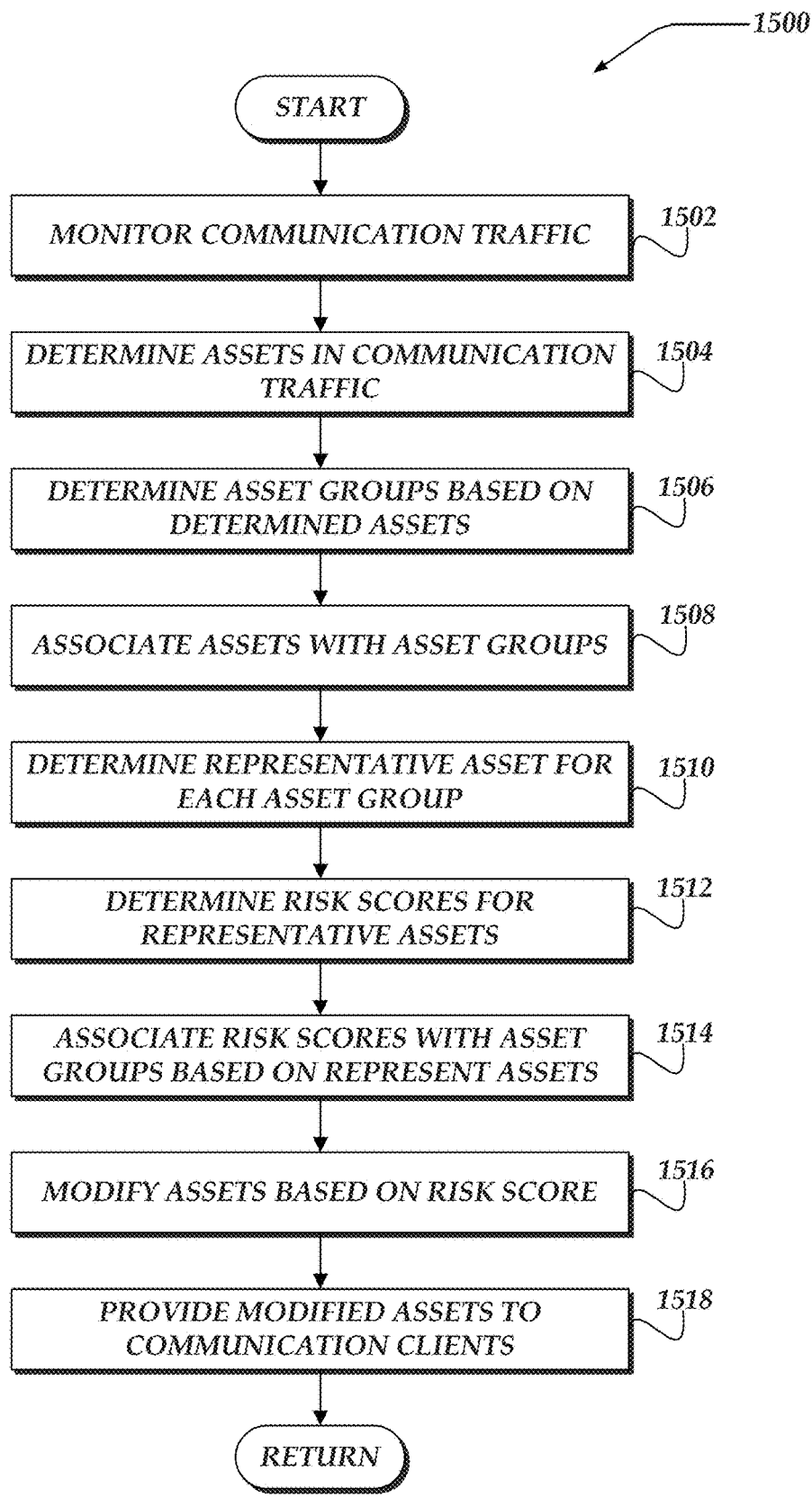
FIG. 15 illustrates a flowchart of process for assessing assets in threat assessment based on coordinated monitoring of local communication clients in accordance with one or more of the various embodiments.

FIG. 15 illustrates a flowchart of process 1500 for assessing assets in threat assessment based on coordinated monitoring of local communication clients in accordance with one or more of the various embodiments. After a start block, at block 1502, in one or more of the various embodiments, an assessment agent may be arranged to monitor communication traffic for one or more communication clients.

At block 1504, in one or more of the various embodiments, the assessment agent may be arranged to determine one or more assets in the communication traffic.

At block 1506, in one or more of the various embodiments, the assessment agent may be arranged to determine one or more asset groups. In some embodiments, asset groups may be employed to arrange one or more assets into collections based on various characteristics of the assets. In some embodiments, asset groups may be generated on the fly as assets are determined.

In one or more of the various embodiments, each asset group may include assets that may be associated with the same service or service provider. Accordingly, in one or more of the various embodiments, features such as, domain names, URLs, query parameters, or the like, may be used for determining asset groups.

In one or more of the various embodiments, the criteria for creating asset groups may be defined in configuration information using regular expressions, rules, grammars, or the like.

At block 1508, in one or more of the various embodiments, the assessment agent may be arranged to associate one or more assets with each asset group. based on the characteristics of the assets. For example, assets that may be determined to be shortened URLs may be assigned to an asset group. Likewise, in some embodiments, assets may be assigned to asset groups based on services or activities that may be associated with a given asset.

For example, in some embodiments, assets associated with the same content provider may be assigned to one asset group while assets associated with another content provider may be assigned to another asset group.

In one or more of the various embodiments, assets may be assigned to an asset group because the similarities among the assets in the group may improve the performance of the assessments. Accordingly, in one or more of the various embodiments, if assets are grouped based on one or more common features, in some cases, assessing a single member of a group may provide useful assessment information for the other assets in the same group.

Likewise, in one or more of the various embodiments, asset groups may be arranged to include one or more assets that require the same or similar pre-assessment processing or post-assessment processing. For example, in some embodiments, assets that have been encoded similarly (e.g., shortened URLs) may be assigned to a group because they may need to be un-shortened before they can be fully assessed.

At block 1510, in one or more of the various embodiments, the assessment agent may be arranged to determine one or more assets from each asset group to designate a representative asset for the entire group.

In one or more of the various embodiments, any assets in the group may be eligible to be designated a representative asset. Accordingly, in some embodiments, the first asset in the group may be selected. In other embodiments, assessment agent may be arranged to employ configuration information to determine which assets in a group to designate as the representative. For example, configuration information may include a rule that picks representative assets randomly. In another example, configuration information may include a rule that selects the representative asset based on particular features of the asset, such as, the number query parameters associated with an asset, or the like.

At block 1512, in one or more of the various embodiments, the assessment agent may be arranged to determine risk scores for the representative assets. As described above, assessment agents may be arranged to check a local asset catalog for valid assessment information or communicate with an assessment engine to assess assets. In some embodiments, assessment agents may be arranged to communicate with an assessment engine even when there may be valid assessment information found in a local asset catalog.

In one or more of the various embodiments, assessment agents may be arranged to initially rely on assessment information included in a local asset catalog to determine an initial risk score. In some embodiments, the processing time or latency associated with obtaining risk scores may be reduced by using the local asset catalogs. However, in some embodiments, the information in the local asset catalog may be out-of-date even though it has not expired or otherwise become stale.

Accordingly, in one or more of the various embodiments, assessment agents may be arranged to request risk scores for assets even if there may be valid assessment information obtained from a local asset catalog. In some embodiments, if there may be assessment information found in the local asset catalog, the assessment agent may immediately start using that information. And, in some embodiments, if the assessment engines later provides assessment information that is different than the assessment information obtained from the asset catalog, the assessment agent may update the risk scores for the affected assets and update the communication clients as appropriate.

At block 1514, in one or more of the various embodiments, assessment agents may be arranged to associate risk scores based on the representative asset with the asset groups. In some embodiments, assessment agents may be arranged to associate an initial risk scores with each asset based on its membership in the asset groups.

In one or more of the various embodiments, applying the risk score of the representative asset to the rest of the assets in the group improves performance of the client computer or communication client enabling them to use the risk score of the representative asset rather than having to wait for risk scores for each asset. As mentioned, in some embodiments, as assessment engines provide risk scores for the other assets in an asset group, the communication client may be updated if there are differences.

At block 1516, in one or more of the various embodiments, assessment agents may be arranged to modify assets based on their risk score before enabling communication clients to display or otherwise use the assets.

In one or more of the various embodiments, the actual modification may be dependent on one or more characteristics of the asset as well as its risk score. Accordingly, in one or more of the various embodiments, assessment agents may be arranged to employ configuration information determine the particular modifications for a given asset or asset type. For example, in some embodiments: safe link assets may be provided a green border; unknown link assets may be provided an amber border; unsafe link assets may be provided a red border and the URL of the link asset may be modified or disabled.

In some embodiments, assessment agents may receive updated risk scores or assessment information for one or more assets. Accordingly, in some embodiments, if asset risk scores change, assets that may have been previously modified may be modified again.

For example, for some embodiments, the initial assessment information obtained from an asset catalog may indicate that the asset is unsafe. Accordingly, in this example, the asset would be modified to disable interactivity as well as annotating it to alert the user that the asset is unsafe. However, in this example, if asset information received later indicates that the asset is considered safe, the assessment agent may again modify the asset to enable interactivity or annotate the asset to reflect that it is safe.

At block 1518, in one or more of the various embodiments, assessment agents may be arranged to provide the modified assets to the communication clients so they may be rendered for display to the user.

Next, in one or more of the various embodiments, control may be returned to a calling process.

Figure 16:
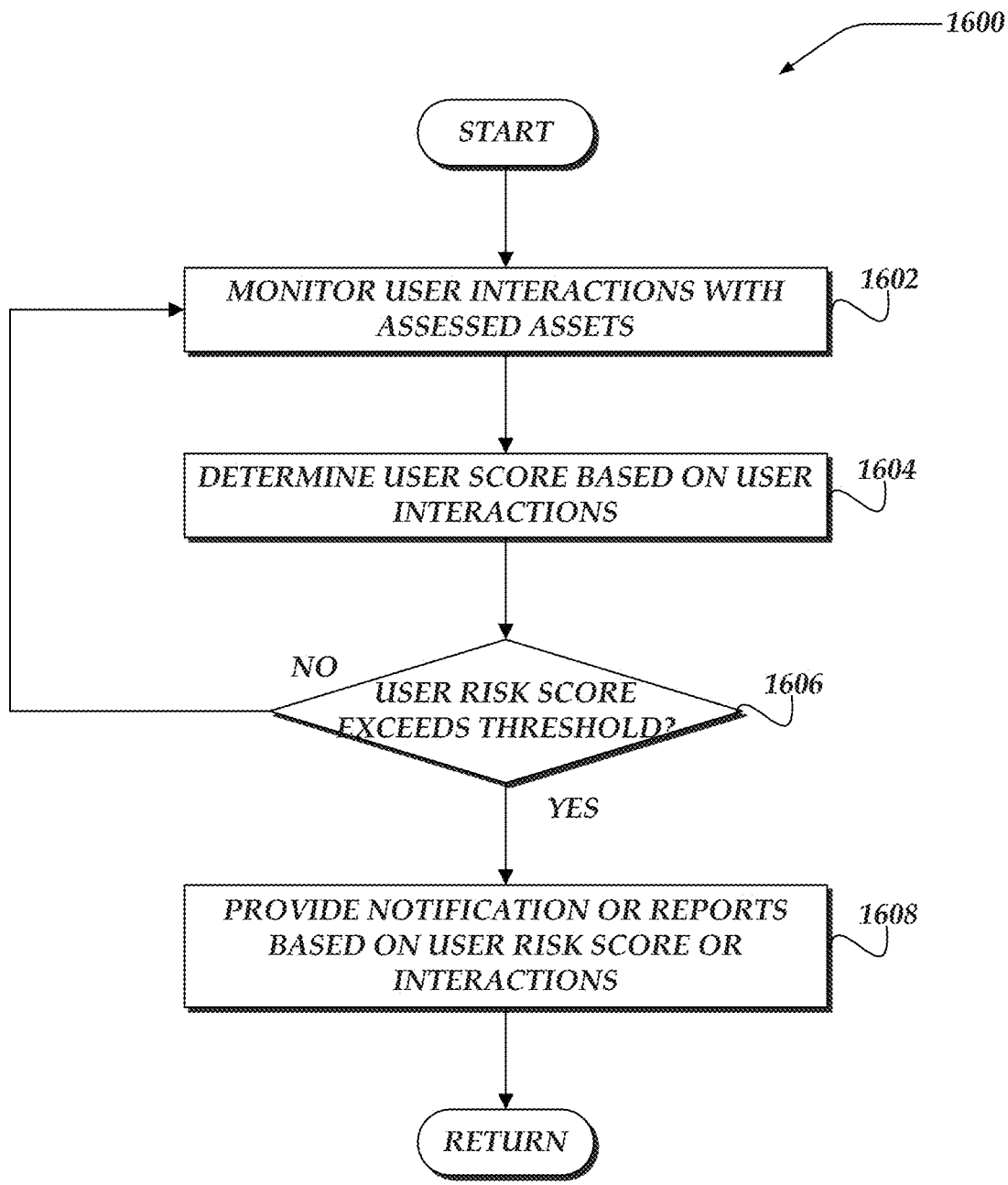
FIG. 16 illustrates a flowchart of a process for performing user assessment in accordance with one or more of the various embodiments

FIG. 16 illustrates a flowchart of process 1600 for performing user assessment in accordance with one or more of the various embodiments. After a start block, at block 1602, in one or more of the various embodiments, an assessment agent may be arranged to monitor user interactions with assessed assets that may be in a communication client.

At block 1604, in one or more of the various embodiments, assessment engines may be arranged to determine a user risk score based on the user interactions. In some embodiments, user risk scores may represent a potential the user may perform risky or otherwise disadvantageous actions. Similar to asset risk scores, user risk scores may be mapped to threat classes, or the like, that may be associated with particular actions, restrictions, alarms, notifications, or the like.

At decision block 1606, in one or more of the various embodiments, if the user risk score exceeds a threshold values, control may flow to block 1608; otherwise, control may loop back to block 1602. In some embodiments, user risk scores may be arranged to be cumulative such that a user's risk score may increase as they perform additional risky interactions. In some embodiments, one or more interactions may be considered so risky that immediate or automatic mitigation actions may be triggered in real-time.

In one or more of the various embodiments, organizations may be enabled to configure user risk score threshold values similar to how they may be enabled to configure how asset risk score are mapped to threat classes.

At block 1608, in one or more of the various embodiments, assessment engines or assessment agents may be arranged to perform various actions, including, providing one or more notification, reports, alarms, or the like, based on user risk scores. In some embodiments, the actions may include automatic threat mitigation, such as, automatically modify the users level of access to the organizations network, or the like. Further, in some embodiments, actions may include automatically initiating just-in-time training, or the like, to help the user learn how to be safer.

In one or more of the various embodiments, assessment engines may be configured to provide notifications or alarms to other internal or external services. Accordingly, in one or more of the various embodiments, the other internal or external services may be configured to perform various actions in response to the potentially unsafe user interactions. Next, in some embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method of managing communication over a network, wherein execution of the method by one or more processors, performs actions comprising:

employing a co-located assessment agent to monitor communication traffic and determine a plurality of assets and one or more interactions with one or more of a plurality of communication clients, wherein each asset is associated with one or more remote services and the one or more communication clients;

determining one or more asset groups associated with one or more of the plurality of assets based on one or more characteristics of the plurality of assets;

determining one or more representative assets from each asset group;

determining one or more risk scores associated with each asset in a same asset group as the one or more representative assets based on the one or more remote services associated with the one or more representative assets and the one or more interactions with the one or more communication clients, wherein a first value for each of the one or more risk scores is initially generated based on a catalog local to a communication client, and wherein a succeeding value of the first value is generated remotely based on an assessment model;

modifying the one or more assets based on one or more of the first value or the succeeding value of each associated risk score, wherein the one or more modified assets are provided to one or more communication clients for display to a user;

monitoring one or more user interactions with the plurality of modified assets, wherein a report is provided to the user based on the one or more user interactions; and providing a user risk score based on an assessment of the user interactions, wherein the user risk score is employed to perform one or more actions including initiating just-in-time training.

2. The method of claim 1, further comprising, automatically updating the one or more modified assets based on one or more updated risk scores, wherein the one or more updated modified assets are provided to the one or more communication clients for display to the user.

3. The method of claim 1, wherein determining the one or more risk scores, further comprises:

providing one or more catalog entries based on the one or more representative assets, wherein the one or more catalog entries are obtained from an asset catalog; and determining the one or more risk scores based on the one or more catalog entries.

4. The method claim 1, wherein the one or more assets include one or more of Hyper Text Markup Language (HTML) anchor tags, or user-interface controls.

5. The method of claim 1, further comprising:

determining one or more encoded assets from the plurality of assets based on one or more characteristics of the one or more encoded assets;

determining one or more decoders based on the one or more encoded assets; and employing the one or more decoders to decode the one or more encoded assets, wherein the one or more decoded assets are associated with the one or more asset groups.

6. The method of claim 1, wherein determining the one or more risk scores further comprises:

generating one or more initial risk scores based on an initial analysis of the one or more assets, wherein the one or more initial risk scores are immediately provided to the assessment agent;

generating one or more other risk scores based on an advanced analysis and the one or more assets; and providing the one or more other risk scores to the assessment agent, wherein the one or more modified assets are modified again based on the one or more other risk scores.

7. The method of claim 1, wherein modifying each of the plurality of assets, further comprises:

providing style information that corresponds to the one or more risk scores, wherein the one or more communication clients display the one or more plurality of assets based on the style information;

disabling one or more interactive features of one or more of the plurality of assets based on the one or more risk scores; and stripping a Uniform Resource Locator (URL) from the one or more of the plurality of assets based on the one or more risk scores.

8. A system for managing communication over a network, comprising:

a network computer, that includes:
a transceiver that communicates over the network;
a memory that stores at least instructions; and
one or more processors that execute instructions that perform actions, including:

employing a co-located assessment agent to monitor communication traffic and determine a plurality of assets and one or more interactions with one or more of a plurality of communication clients, wherein each asset is associated with one or more remote services and the one or more communication clients;

determining one or more asset groups associated with one or more of the plurality of assets based on one or more characteristics of the plurality of assets;

determining one or more representative assets from each asset group;

determining one or more risk scores associated with each asset in a same asset group as the one or more representative assets based on the one or more remote services associated with the one or more representative assets and the one or more interactions with the one or more communication clients, wherein a first value for each of the one or more risk scores is initially generated based on a catalog local to a communication client, and wherein a succeeding value of the first value is generated remotely based on an assessment model;

modifying the one or more assets based on one or more of the first value or the succeeding value of each associated risk score, wherein the one or more modified assets are provided to one or more communication clients for display to a user;

monitoring one or more user interactions with the plurality of modified assets, wherein a report is provided to the user based on the one or more user interactions; and providing a user risk score based on an assessment of the user interactions, wherein the user risk score is employed to perform one or more actions including initiating just-in-time training; and a client computer, comprising:
a transceiver that communicates over the network;
a memory that stores at least instructions; and
one or more processors that execute instructions that perform actions, including:
hosting at least one of the plurality of communication clients.

9. The system of claim 8, wherein the one or more processors of the client computer execute instructions that perform actions further comprising:

provide automatically updating the one or more modified assets based on one or more updated risk scores, wherein the one or more updated modified assets are provided to the one or more communication clients for display to the user.

10. The system of claim 8, wherein determining the one or more risk scores, further comprises:

providing one or more catalog entries based on the one or more representative assets, wherein the one or more catalog entries are obtained from an asset catalog; and determining the one or more risk scores based on the one or more catalog entries.

11. The system of claim 8, wherein the one or more assets include one or more of Hyper Text Markup Language (HTML) anchor tags, or user-interface controls.

12. The system of claim 8, wherein the one or more processors of the client computer execute instructions that perform actions further comprising:

determining one or more encoded assets from the plurality of assets based on one or more characteristics of the one or more encoded assets;

determining one or more decoders based on the one or more encoded assets; and employing the one or more decoders to decode the one or more encoded assets, wherein the one or more decoded assets are associated with the one or more asset groups.

13. The system of claim 8, wherein determining the one or more risk scores further comprises:

generating one or more initial risk scores based on an initial analysis of the one or more assets, wherein the one or more initial risk scores are immediately provided to the assessment agent;

generating one or more other risk scores based on an advanced analysis and the one or more assets; and providing the one or more other risk scores to the assessment agent, wherein the one or more modified assets are modified again based on the one or more other risk scores.

14. The system of claim 8, wherein modifying each of the plurality of assets, further comprises:

providing style information that corresponds to the one or more risk scores, wherein the one or more communication clients display the one or more plurality of assets based on the style information;

disabling one or more interactive features of one or more of the plurality of assets based on the one or more risk scores; and stripping a Uniform Resource Locator (URL) from the one or more of the plurality of assets based on the one or more risk scores.

15. A processor readable non-transitory storage media that includes instructions for managing communication over a network, wherein execution of the instructions by one or more processors, performs actions, comprising:

employing a co-located assessment agent to monitor communication traffic and determine a plurality of assets and one or more interactions with one or more of a plurality of communication clients, wherein each asset is associated with one or more remote services and the one or more communication clients;

determining one or more asset groups associated with one or more of the plurality of assets based on one or more characteristics of the plurality of assets;

determining one or more representative assets from each asset group;

determining one or more risk scores associated with each asset in a same asset group as the one or more representative assets based on the one or more remote services associated with the one or more representative assets and the one or more interactions with the one or more communication clients, wherein a first value for each of the one or more risk scores is initially generated based on a catalog local to a communication client, and wherein a succeeding value of the first value is generated remotely based on an assessment model;

modifying the one or more assets based on one or more of the first value or the succeeding value of each associated risk score, wherein the one or more modified assets are provided to one or more communication clients for display to a user;

monitoring one or more user interactions with the plurality of modified assets, wherein a report is provided to the user based on the one or more user interactions; and providing a user risk score based on an assessment of the user interactions, wherein the user risk score is employed to perform one or more actions including initiating just-in-time training.

16. The media of claim 15, further comprising:

automatically updating the one or more modified assets based on one or more updated risk scores, wherein the one or more updated modified assets are provided to the one or more communication clients for display to the user.

17. The media of claim 15, wherein determining the one or more risk scores, further comprises:

providing one or more catalog entries based on the one or more representative assets, wherein the one or more catalog entries are obtained from an asset catalog; and determining the one or more risk scores based on the one or more catalog entries.

18. The media of claim 15, further comprising:

determining one or more encoded assets from the plurality of assets based on one or more characteristics of the one or more encoded assets;

determining one or more decoders based on the one or more encoded assets; and employing the one or more decoders to decode the one or more encoded assets, wherein the one or more decoded assets are associated with the one or more asset groups.

19. The media of claim 15, wherein determining the one or more risk scores further comprises:

generating one or more initial risk scores based on an initial analysis of the one or more assets, wherein the one or more initial risk scores are immediately provided to the assessment agent;

generating one or more other risk scores based on an advanced analysis and the one or more assets; and providing the one or more other risk scores to the assessment agent, wherein the one or more modified assets are modified again based on the one or more other risk scores.

20. The media of claim 15, wherein modifying each of the plurality of assets, further comprises:

providing style information that corresponds to the one or more risk scores, wherein the one or more communication clients display the one or more plurality of assets based on the style information;

disabling one or more interactive features of one or more of the plurality of assets based on the one or more risk scores; and stripping a Uniform Resource Locator (URL) from the one or more of the plurality of assets based on the one or more risk scores.

21. A network computer for managing communication over a network, comprising:
a transceiver that communicates over the network;
a memory that stores at least instructions; and
one or more processors that execute instructions that perform actions, including:
employing a co-located assessment agent to monitor communication traffic and determine a plurality of assets and one or more interactions with one or more of a plurality of communication clients, wherein each asset is associated with one or more remote services and the one or more communication clients;
determining one or more asset groups associated with one or more of the plurality of assets based on one or more characteristics of the plurality of assets;
determining one or more representative assets from each asset group;
determining one or more risk scores associated with each asset in a same asset group as the one or more representative assets based on the one or more remote services associated with the one or more representative assets and the one or more interactions with the one or more communication clients, wherein a first value for each of the one or more risk scores is initially generated based on a catalog local to a communication client, and wherein a succeeding value of the first value is generated remotely based on an assessment model;
modifying the one or more assets based on one or more of the first value or the succeeding value of each associated risk score, wherein the one or more modified assets are provided to one or more communication clients for display to a user;
monitoring one or more user interactions with the plurality of modified assets, wherein a report is provided to the user based on the one or more user interactions; and
providing a user risk score based on an assessment of the user interactions, wherein the user risk score is employed to perform one or more actions including initiating just-in-time training.

22. The network computer of claim 21, wherein the one or more processors execute instructions that perform actions further comprising, automatically updating the one or more modified assets based on one or more updated risk scores, wherein the one or more updated modified assets are provided to the one or more communication clients for display to the user.

23. The network computer of claim 21, wherein determining the one or more risk scores,
further comprises:
providing one or more catalog entries based on the one or more representative assets, wherein the one or more catalog entries are obtained from an asset catalog; and
determining the one or more risk scores based on the one or more catalog entries.

24. The network computer of claim 21, wherein the one or more assets include one or more of Hyper Text Markup Language (HTML) anchor tags, or user-interface controls.

25. The network computer of claim 21, wherein the one or more processors execute instructions that perform actions further comprising:
determining one or more encoded assets from the plurality of assets based on one or more characteristics of the one or more encoded assets;
determining one or more decoders based on the one or more encoded assets; and
employing the one or more decoders to decode the one or more encoded assets, wherein the one or more decoded assets are associated with the one or more asset groups.

26. The network computer of claim 21, wherein determining the one or more risk scores
further comprises:
generating one or more initial risk scores based on an initial analysis of the one or more assets, wherein the one or more initial risk scores are immediately provided to the assessment agent;
generating one or more other risk scores based on an advanced analysis and the one or more assets; and
providing the one or more other risk scores to the assessment agent, wherein the one or more modified assets are modified again based on the one or more other risk scores.

27. The network computer of claim 21, wherein modifying each of the plurality of assets,
further comprises:
providing style information that corresponds to the one or more risk scores, wherein the one or more communication clients display the one or more plurality of assets based on the style information;
disabling one or more interactive features of one or more of the plurality of assets based on the one or more risk scores; and
stripping a Uniform Resource Locator (URL) from the one or more of the plurality of assets based on the one or more risk scores.

* * * * *